US012731587B2

(12) United States Patent
Kumar et al.

(10) Patent No.: US 12,731,587 B2
(45) Date of Patent: Sep. 8, 2026

(54) VISUAL SPEECH RECOGNITION FOR DIGITAL VIDEOS UTILIZING GENERATIVE ADVERSARIAL LEARNING

(71) Applicant: Adobe Inc., San Jose, CA (US)

(72) Inventors: Yaman Kumar, New Delhi (IN); Balaji Krishnamurthy, Noida (IN)

(73) Assignee: Adobe Inc., San Jose, CA (US)

( * ) Notice: Subject to any disclaimer, the term of this patent is extended or adjusted under 35 U.S.C. 154(b) by 397 days.

(21) Appl. No.: 17/650,020

(22) Filed: Feb. 4, 2022

(65) Prior Publication Data

US 2023/0252993 A1 Aug. 10, 2023

(51) Int. Cl.
*G10L 15/25* (2013.01)
*G06F 18/23213* (2023.01)
(Continued)

(52) U.S. Cl.
CPC ........ *G10L 15/25* (2013.01); *G06F 18/23213* (2023.01); *G06N 3/02* (2013.01);
(Continued)

(58) Field of Classification Search
CPC ......... G10L 15/25; G10L 13/02; G10L 15/16; G10L 15/22; G10L 25/57; G10L 13/027;
(Continued)

(56) References Cited

U.S. PATENT DOCUMENTS

2020/0135226 A1 4/2020 Mittal et al.

FOREIGN PATENT DOCUMENTS

CN 109741736 A 5/2019
CN 110624247 A 12/2019
(Continued)

OTHER PUBLICATIONS

S. Ma, S. Wang and X. Lin, "A Transformer-based Model for Sentence-Level Chinese Mandarin Lipreading," 2020 IEEE Fifth International Conference on Data Science in Cyberspace (DSC), Hong Kong, China, 2020, pp. 78-81, doi: 10.1109/DSC50466.2020.00020. (Year: 2020).*
(Continued)

*Primary Examiner* — Daniel C Washburn
*Assistant Examiner* — Penny L Caudle
(74) *Attorney, Agent, or Firm* — Keller Preece PLLC

(57) ABSTRACT

This disclosure describes one or more implementations of systems, non-transitory computer-readable media, and methods that recognize speech from a digital video utilizing an unsupervised machine learning model, such as a generative adversarial neural network (GAN) model. In one or more implementations, the disclosed systems utilize an image encoder to generate self-supervised deep visual speech representations from frames of an unlabeled (or unannotated) digital video. Subsequently, in one or more embodiments, the disclosed systems generate viseme sequences from the deep visual speech representations (e.g., via segmented visemic speech representations from clusters of the deep visual speech representations) utilizing the adversarially trained GAN model. Indeed, in some instances, the disclosed systems decode the viseme sequences belonging to the digital video to generate an electronic transcription and/or digital audio for the digital video.

20 Claims, 10 Drawing Sheets

(51) Int. Cl.

| | |
|---|---|
| ***G06N 3/02*** | (2006.01) |
| ***G06T 9/00*** | (2006.01) |
| ***G06V 10/82*** | (2022.01) |
| ***G06V 20/40*** | (2022.01) |
| ***G10L 13/02*** | (2013.01) |
| ***G10L 15/16*** | (2006.01) |
| ***G10L 15/22*** | (2006.01) |
| ***G10L 25/57*** | (2013.01) |

(52) U.S. Cl.
CPC .............. *G06T 9/002* (2013.01); *G06V 10/82* (2022.01); *G06V 20/49* (2022.01); *G10L 13/02* (2013.01); *G10L 15/16* (2013.01); *G10L 15/22* (2013.01); *G10L 25/57* (2013.01)

(58) Field of Classification Search
CPC ......... G10L 15/24; G10L 21/10; G10L 15/08; G06F 18/23213; G06N 3/02; G06N 3/045; G06N 3/0464; G06N 3/0475; G06N 3/084; G06N 3/088; G06N 3/094; G06T 9/002; G06V 10/82; G06V 20/49; G06V 40/16
See application file for complete search history.

(56) References Cited

FOREIGN PATENT DOCUMENTS

| | | | | |
|---|---|---|---|---|
| CN | 112041924 A | | 12/2020 | |
| WO | WO-02057896 A2 | * | 7/2002 | ........... G06F 3/0481 |
| WO | WO-2020044052 A1 | * | 3/2020 | ......... G06K 9/00335 |
| WO | WO-2020152657 A1 | * | 7/2020 | ........... G06T 13/205 |

OTHER PUBLICATIONS

A. Fernandez-Lopez and F. M. Sukno, "Survey on the Automatic Lip-Reading in the Era of Deep Learning," in Image and Vision Computing 78 (2018)pp. 53-72 (Year: 2018).*

Afouras, T.; Chung, J. S.; Senior, A.; Vinyals, O.; and Zisserman, A. 2018. Deep audio-visual speech recognition. IEEE transactions on pattern analysis and machine intelligence.

Afouras, T.; Chung, J. S.; and Zisserman, A. 2018. LRS3-TED: a large-scale dataset for visual speech recognition. arXiv preprint arXiv:1809.00496.

Anina, I.; Zhou, Z.; Zhao, G.; and Pietikäinen, M. 2015. Ouluvs2: A multi-view audiovisual database for non-rigid mouth motion analysis. In 2015 11th IEEE International Conference and Workshops on Automatic Face and Gesture Recognition (FG), vol. 1, 1-5. IEEE.

Artetxe, M.; Labaka, G.; and Agirre, E. 2017. Learning bilingual word embeddings with (almost) No. bilingual data. In Proceedings of the 55th Annual Meeting of the Association for Computational Linguistics (vol. 1: Long Papers). Association for Computational Linguistics.

Artetxe, M.; Labaka, G.; Agirre, E.; and Cho, K. 2018. Unsupervised Neural Machine Translation. In 6th International Conference on Learning Representations, ICLR 2018, Vancouver, BC, Canada, Apr. 30-May 3, 2018, Conference Track Proceedings. OpenReview.net.

Assael, Y. M.; Shillingford, B.; Whiteson, S.; and De Freitas, N. 2016. Lipnet: Sentence-level lipreading. arXiv preprint arXiv:1611.01599, 2(4).

Baevski, A.; Hsu, W.-N.; Conneau, A.; and Auli, M. 2021. Unsupervised Speech Recognition. arXiv preprint arXiv:2105.11084.

Baevski, A.; Zhou, Y.; Mohamed, A.; and Auli, M. 2020. wav2vec 2.0: A Framework for Self-Supervised Learning of Speech Representations. In Advances in Neural Information Processing Systems 33: Annual Conference on Neural Information Processing Systems 2020, NeurIPS 2020, Dec. 6-12, 2020, virtual.

Chen, K.-Y.; Tsai, C.-P.; Liu, D.-R.; Lee, H.-Y.; and Lee, L.-s. 2019. Completely Unsupervised Speech Recognition by a Generative Adversarial Network Harmonized With Iteratively Refined Hidden Markov Models. arXiv preprint arXiv:1904.04100.

Chung, J. S.; Senior, A. W.; Vinyals, O.; and Zisserman, A. 2017. Lip Reading Sentences in the Wild. In 2017 IEEE Conference on Computer Vision and Pattern Recognition, CVPR 2017, Honolulu, HI, USA, Jul. 21-26, 2017. IEEE Computer Society.

Chung, J. S.; and Zisserman, A. 2016. Lip reading in the wild. In Asian conference on computer vision. Springer.

Dosovitskiy, A.; Beyer, L.; Kolesnikov, A.; Weissenborn, D.; Zhai, X.; Unterthiner, T.; Dehghani, M.; Minderer, M.; Heigold, G.; Gelly, S.; et al. 2020. An image is worth 16x16 words: Transformers for image recognition at scale. arXiv preprint arXiv:2010.11929.

Goodfellow, I.; Pouget-Abadie, J.; Mirza, M.; Xu, B.; Warde-Farley, D.; Ozair, S.; Courville, A.; and Bengio, Y. 2014. Generative adversarial nets. Advances in neural information processing systems, 27.

Gulrajani, I.; Ahmed, F.; Arjovsky, M.; Dumoulin, V.; and Courville, A. C. 2017. Improved Training of Wasserstein GANs. In Advances in Neural Information Processing Systems 30: Annual Conference on Neural Information Processing Systems 2017, Dec. 4-9, 2017, Long Beach, Ca, USA, 5767-5777.

Kamper, H.; Jansen, A.; and Goldwater, S. 2017. A segmental framework for fully-unsupervised large-vocabulary speech recognition. Computer Speech & Language, 46: 154-174.

Kreuk, F.; Keshet, J.; and Adi, Y. 2020. Self-supervised contrastive learning for unsupervised phoneme segmentation. arXiv preprint arXiv:2007.13465.

Kumar, Y.; Aggarwal, M.; Nawal, P.; Satoh, S.; Shah, R. R.; and Zimmermann, R. 2018. Harnessing AI for Speech Reconstruction using Multi-view Silent Video Feed. In 2018 ACM Multimedia Conference on Multimedia Conference, MM 2018, Seoul, Republic of Korea, Oct. 22-26, 2018.

Kumar, Y.; Jain, R.; Salik, K. M.; Shah, R. R.; Yin, Y.; and Zimmermann, R. 2019. Lipper: Synthesizing thy speech using multi-view lipreading. In Proceedings of the AAAI Conference on Artificial Intelligence, vol. 33, 2588-2595.

Kumar, Y.; Sahrawat, D.; Maheshwari, S.; Mahata, D.; Stent, A.; Yin, Y.; Shah, R. R.; and Zimmermann, R. 2020. Harnessing gans for zero-shot learning of new classes in visual speech recognition. In Proceedings of the AAAI Conference on Artificial Intelligence, vol. 34, 2645-2652.

Lample, G.; Conneau, A.; Denoyer, L.; and Ranzato, M. 2018a. Unsupervised Machine Translation Using Monolingual Corpora Only. In 6th International Conference on Learning Representations, ICLR 2018, Vancouver, BC, Canada, Apr. 30-May 3, 2018, Conference Track Proceedings. OpenReview.net.

Lample, G.; Conneau, A.; Ranzato, M.; Denoyer, L.; and Jé gou, H. 2018b. Word translation without parallel data. In 6th International Conference on Learning Representations, ICLR 2018, Vancouver, BC, Canada, Apr. 30-May 3, 2018, Conference Track Proceedings. OpenReview.net.

Liu, D.-R.; Chen, K.-Y.; Lee, H.-y.; and Lee, L.-s. 2018. Completely unsupervised phoneme recognition by adversarially learning mapping relationships from audio embeddings. arXiv preprint arXiv:1804.00316.

Liu, Z.; Lin, Y.; Cao, Y.; Hu, H.; Wei, Y.; Zhang, Z.; Lin, S.; and Guo, B. 2021a. Swin transformer: Hierarchical vision transformer using shifted windows. arXiv preprint arXiv:2103.14030.

Liu, Z.; Ning, J.; Cao, Y.; Wei, Y.; Zhang, Z.; Lin, S.; and Hu, H. 2021b. Video swin transformer. arXiv preprint arXiv:2106.13230.

Ma, P.; Petridis, S.; and Pantic, M. 2021. End-To-End Audio-Visual Speech Recognition with Conformers. In ICASSP 2021-2021 IEEE International Conference on Acoustics, Speech and Signal Processing (ICASSP). IEEE.

Mathur, A. N.; Batra, D.; Singla, Y. K.; Shah, R. R.; Chen, C.; and Zimmermann, R. 2021. Lifi: Towards linguistically informed frame interpolation. In ICASSP 2021-2021 IEEE International Conference on Acoustics, Speech and Signal Processing (ICASSP). IEEE.

Mikolov, T.; Le, Q. V.; and Sutskever, I. 2013. Exploiting similarities among languages for machine translation. arXiv preprint arXiv:1309.4168.

(56) References Cited

OTHER PUBLICATIONS

Mortensen, D. R.; Dalmia, S.; and Littell, P. 2018. Epitran: Precision G2P for Many Languages. In chair), N. C. C.; Choukri, K.; Cieri, C.; Declerck, T.; Goggi, S.; Hasida, K.; Isahara, H.; Maegaard, B.; Mariani, J.; Mazo, H.; Moreno, A.; Odijk, J.; Piperidis, S.; and Tokunaga, T., eds., Proceedings of the Eleventh International Conference on Language Resources and Evaluation (LREC 2018). Paris, France: European Language Resources Association (ELRA). ISBN 979-10-95546-00-9.

Park, D. S.; Zhang, Y.; Jia, Y.; Han, W.; Chiu, C.-C.; Li, B.; Wu, Y.; and Le, Q. V. 2020. Improved Noisy Student Training for Automatic Speech Recognition. Interspeech 2020.

Petridis, S.; Stafylakis, T.; Ma, P.; Tzimiropoulos, G.; and Pantic, M. 2018. Audio-visual speech recognition with a hybrid ctc/attention architecture. In 2018 IEEE Spoken Language Technology Workshop (SLT). IEEE.

Ponte, J. M.; and Croft, W. B. 1998. A language modeling approach to information retrieval. In Proceedings of the 21st annual international ACM SIGIR conference on Research and development in information retrieval.

Ramachandran, P.; Liu, P.; and Le, Q. 2017. Unsupervised Pretraining for Sequence to Sequence Learning. In Proceedings of the 2017 Conference on Empirical Methods in Natural Language Processing. Association for Computational Linguistics.

Shah, J.; Singla, Y. K.; Chen, C.; and Shah, R. R. 2021. What all do audio transformer models hear? probing acoustic representations for language delivery and its structure. arXiv preprint arXiv:2101.00387.

Shrivastava, N.; Saxena, A.; Kumar, Y.; Shah, R. R.; Stent, A.; Ma-hata, D.; Kaur, P.; and Zimmermann, R. 2019. MobiVSR: Efficient and Light-Weight Neural Network for Visual Speech Recognition on Mobile Devices. In Interspeech.

Srivastava, N.; Mansimov, E.; and Salakhutdinov, R. 2015. Unsupervised Learning of Video Representations using LSTMs. In Proceedings of the 32nd International Conference on Machine Learning, ICML 2015, Lille, France, Jul. 6-11, 2015, vol. 37 of JMLR Workshop and Conference Proceedings. JMLR.org.

Yang, S.; Zhang, Y.; Feng, D.; Yang, M.; Wang, C.; Xiao, J.; Long, K.; Shan, S.; and Chen, X. 2019. LRW-1000: A naturally-distributed large-scale benchmark for lip reading in the wild. In 2019 14th IEEE International Conference on Automatic Face & Gesture Recognition (FG 2019), 1-8. IEEE.

Yeh, C.; Chen, J.; Yu, C.; and Yu, D. 2019. Unsupervised Speech Recognition via Segmental Empirical Output Distribution Matching. In 7th International Conference on Learning Representa-tions, ICLR 2019, New Orleans, LA, USA, May 6-9, 2019. Open-Review.net.

Zhang, M.; Liu, Y.; Luan, H.; and Sun, M. 2017. Adversarial Training for Unsupervised Bilingual Lexicon Induction. In Proceedings of the 55th Annual Meeting of the Association for Computational Linguistics (vol. 1: Long Papers). Association for Computational Linguistics.

Fisher, C. G. 1968. Confusions among visually perceived consonants. Journal of speech and hearing research, 11(4) 796-804, DOI: 10.1044/jshr.1104.796, Retrieved from the Internet: URL:https://pubs.asha.org 107.2.59.208 on Feb. 16, 2024.

McGurk, H.; and MacDonald, J. 1976. Hearing lips and seeing voices. Nature, 264 (746-748).

Yang, C.; Wang, S.; Zhang, X.; and Zhu, Y. 2020. Speaker-Independent Lipreading With Limited Data. In 2020 IEEE International Conference on Image Processing (ICIP). IEEE.

Zhang, X.; Cheng, F.; and Wang, S. 2019. Spatio-Temporal Fusion Based Convolutional Sequence Learning for Lip Reading. In 2019 IEEE/CVF International Conference on Computer Vision, ICCV 2019, Seoul, Korea (South), Oct. 27-Nov. 2, 2019. IEEE.

Office Action as received in CN 202211407981.2 dated Dec. 6, 2025.

Yurou Chen, "Research on Chinese Lip Reading Algorithm Based on Viseme Phoneme Mapping", Information Technology Series, No. 01, [English abstract] Jan. 15, 2021, pp. 75.

Zhang Yihao, "Construction of a Dynamic Visemes Model of Tibetan Vowles in Lhasa Dialect Based on Facial Motion Capture", Philosophy and Humanities Series, No. 09, [English abstract] Sep. 15, 2022, 72 pages.

Office Action as received in CN 202211407981.2 dated May 10, 2026.

* cited by examiner

VISUAL SPEECH RECOGNITION FOR DIGITAL VIDEOS UTILIZING GENERATIVE ADVERSARIAL LEARNING

BACKGROUND

Recent years have seen an increasing implementation of computer systems that implement learning models to perform visual speech recognition tasks. For example, conventional systems can use machine learning models to recognize spoken words within digital videos when the digital videos lack an audio component (or have an incoherent audio component). Oftentimes, the task of recognizing spoken words includes identifying basic decomposable units that represent speech (e.g., visemes) from a digital video. In order to accomplish the visual speech recognition task, conventional systems oftentimes utilize supervised machine learning models that utilize labeled training data. Although many conventional systems utilize such supervised machine learning models, many of these conventional systems have a number of shortcomings, particularly with regards to flexibility, accuracy, and efficiency of implementing computing devices.

For example, many conventional systems utilize supervised visual speech recognition models that require labeled training data. Many of these conventional systems are unable to flexibly recognize speech in a wide variety of videos that are not represented by the labeled training data. Indeed, these conventional systems are often limited to specific visual speech recognition tasks that are learned through available labeled training data. In addition to the rigidness in recognition scope, many conventional systems inaccurately perform speech recognition tasks on particular digital videos when the speech recognition model has not trained on annotated training data relevant to the particular digital videos. Accordingly, many conventional systems are inaccurate and unable to accomplish speech recognition tasks across different digital video domains.

Furthermore, conventional systems are often computationally inefficient. In order to perform speech recognition tasks, many conventional systems require large, annotated training data sets. In addition, many conventional systems also require a significant amount of training time to process and train robust machine learning architectures with voluminous labeled training data. Accordingly, many conventional systems utilize excessive computing resources in data storage (e.g., for large, annotated training data sets) and processing power (e.g., for iterative training procedures) to perform speech recognition tasks.

SUMMARY

This disclosure describes one or more implementations of systems, non-transitory computer readable media, and methods that solve one or more of the foregoing problems by utilizing an unsupervised machine learning model to recognize speech from a digital video. In particular, in one or more embodiments, the disclosed systems, utilize an unsupervised generative adversarial neural network (GAN) to perform the visual speech recognition task. To illustrate, in one or more implementations, the disclosed systems utilize an image encoder to generate self-supervised deep visual speech representations from frames of an unlabeled (or unannotated) digital video. In one or more embodiments, the disclosed systems determine segmented visemic speech representations from clusters of the deep visual representations and then generate viseme sequences (or visemes in combination with phonemes) by utilizing the GAN model with the segmented visemic speech representations. The disclosed systems decode the viseme sequences to extract spoken language illustrated in the digital video, for example, by generating an electronic transcription for the digital video and/or generating digital audio for the digital video. In this manner, the disclosed systems can utilize unsupervised machine learning to efficiently, accurately, and flexibly recognize speech from digital video (with or without accompanying digital audio).

BRIEF DESCRIPTION OF THE DRAWINGS

The detailed description is described with reference to the accompanying drawings in which.

DETAILED DESCRIPTION

Figure 1:
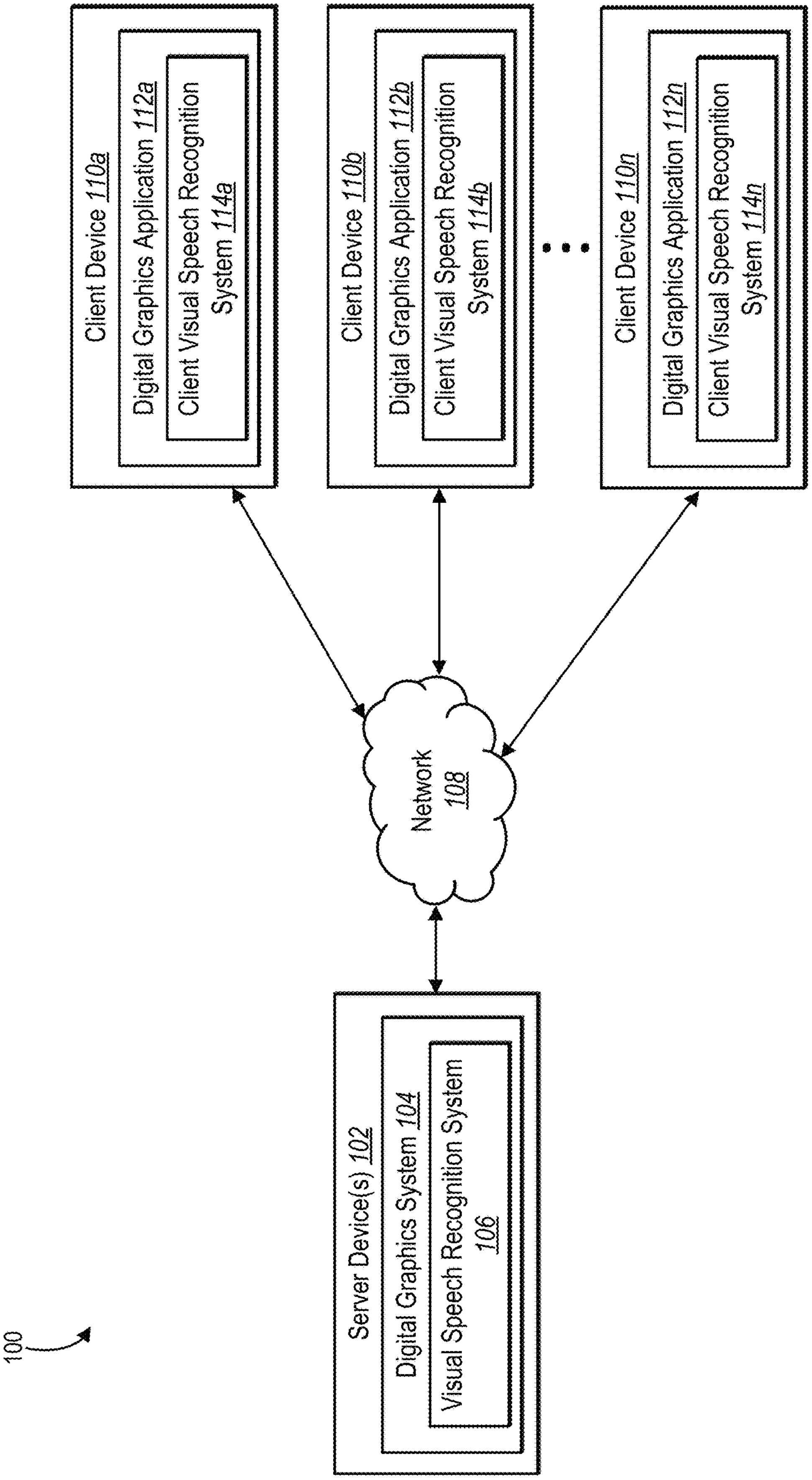
FIG. 1 illustrates a schematic diagram of an example system environment in which the visual speech recognition system operates in accordance with one or more implementations.

This disclosure describes one or more implementations of a visual speech recognition system that determines visual speech from a digital video (without corresponding audio) utilizing an unsupervised machine learning model. In particular, the visual speech recognition system can utilize a GAN to generate viseme sequences from self-supervised speech representations of a digital video. For example, the visual speech recognition system utilizes a representation learning model to generate deep visual speech representations from frames of a digital video. Then, the visual speech recognition system clusters the deep visual speech representations and determines segmented visemic speech representations that reflect separate visemic units from the digital video. Furthermore, the visual speech recognition system utilizes the segmented visemic speech representations with a GAN to generate viseme sequences. Furthermore, in some embodiments, the visual speech recognition system converts the viseme sequences into an electronic transcription and/or digital audio for the digital video. Accordingly, the visual speech recognition system can utilize an unsupervised machine learning model to efficiently, accurately, and flexibly recognize speech from digital videos with silent or incomprehensible digital audio.

As mentioned above, in some implementations, the visual speech recognition system generates deep visual speech representations from a digital video. In particular, in one or more embodiments, the visual speech recognition system utilizes an image encoder with individual frames of a digital video to generate a set of deep visual speech representations. In one or more instances, the visual speech recognition system utilizes a transformer-based image encoder to encode frames and uses embedded encodings of the frames as deep visual speech representations.

Furthermore, in some cases, the visual speech recognition system determines segmented visemic speech representations from clusters of the deep visual speech representations. In one or more implementations, the visual speech recognition system utilizes a clustering algorithm to generates deep visual speech representation clusters from the deep visual speech representations. Moreover, in one or more embodiments, the visual speech recognition system groups digital video frames to represent individual visemes. For instance, the visual speech recognition system identifies similar digital video frames from a cluster and other digital frames that fall within a speech segment boundary to determine a speech segment that represents an individual viseme. In some embodiments, the visual speech recognition system generates a visual speech representation of each frame in the group of digital video frames (e.g., using principal component analysis) and combines the visual speech representations as a segmented visemic speech representation.

Moreover, in one or more embodiments, the visual speech recognition system utilizes the segmented visemic speech representations (that represent a viseme per segment of the digital video) with a GAN to generate possible viseme sequences for the segmented visemic speech representations. Indeed, in one or more implementations, the visual speech recognition system utilizes the GAN to generate one viseme per segmented visemic speech representation. In some implementations, the visual speech recognition system further utilizes the generated viseme sequences with a language decoder to generate an electronic transcript that represents speech portrayed within the digital video. In certain instances, the visual speech recognition system generates visemes in combination with phonemes from the segmented visemic speech representations (as the viseme sequences). Moreover, in one or more embodiments, the visual speech recognition system utilizes the electronic transcript to generate audio content for the digital video.

In one or more embodiments, the visual speech recognition system learns parameters for the GAN utilizing an adversarial process without utilizing labeled (or annotated) training data. For example, the visual speech recognition system trains the GAN to generate accurate viseme sequences utilizing a discriminator neural network. For instance, the visual speech recognition system trains the discriminator neural network to determine the authenticity of a viseme sequence (e.g., real or fake viseme sequence) utilizing viseme sequences generated from the GAN and viseme sequences converted from a text corpus. Indeed, the visual speech recognition system trains a neural discriminator to distinguish between authentic and generated viseme sequences and train the GAN to generate more realistic viseme sequences. The visual speech recognition system also utilizes other losses to learn parameters for the GAN, such as a segment smoothness loss, a viseme diversity loss, and a gradient penalty.

As mentioned above, conventional systems suffer from a number of technical deficiencies. The visual speech recognition system provides a number of advantages relative to these conventional systems. For example, in contrast to conventional systems that rely on supervised speech recognition models, the visual speech recognition system recognizes visual speech from digital videos with increased flexibility. To illustrate, the visual speech recognition system utilizes an unsupervised machine learning approach to determine visual speech from digital videos (i.e., without the utilization of transcribed speech data). Accordingly, the visual speech recognition system can be utilized on a wide variety of digital videos that are not limited by the availability of transcribed speech data (e.g., in addition to new and out-of-vocabulary words). In addition, in some implementations, the visual speech recognition system is also language agnostic and can be trained to recognize visual speech in digital videos of multiple languages even when transcribed speech data is not widely available in the other languages.

Furthermore, unlike conventional systems that utilize large, annotated training data sets to cover a wide variety of digital videos, the visual speech recognition system can train the GAN-based visual speech recognition model to accurately recognize visual speech with less training data. In particular, in one or more implementations, the visual speech recognition system accurately recognizes visual speech from a wider variety of digital videos with less (and unannotated) training data. In addition to the reduction in training data, the visual speech recognition system can also utilize less training time in comparison to many conventional systems. Accordingly, in one or more instances, the visual speech recognition system trains a GAN-based visual speech recognition model to accurately and efficiently recognize visual speech with less computing resources (e.g., data storage and processing time).

In addition, the visual speech recognition system can also accurately determine visual speech from digital videos without transcribed speech training data. In particular, as described in greater detail below, the visual speech recognition system can perform visual speech recognition that is comparable to many supervised approaches with less training data and less training time. Indeed, in one or more embodiments, the visual speech recognition system performs visual speech recognition that is comparably accurate to many supervised approaches without utilizing transcribed speech training data.

As suggested by the foregoing discussion, this disclosure utilizes a variety of terms to describe features and benefits of the visual speech recognition system. Additional detail is hereafter provided regarding the meaning of these terms as used in this disclosure. For example, as used herein, the term "image encoder" refers to a computer-implemented model that generates an embedding of an image. In particular, the term "image encoder" can include a computer-implemented model that generates a deep visual speech representation from an image that captures, as a representation, characteristics (or attributes) of facial features portrayed within the image. For example, an image encoder includes a transformer-based image encoder that utilize a transformer encoder having self-attention layers that generate patch embeddings for the input image as the deep visual speech representation. In some instances, the image encoder includes a neural network-based image encoder that generates a deep visual speech representation from an input image.

Furthermore, as used herein, the term "deep visual speech representation" (sometimes referred to as visual speech representation) refers to an embedding or encoding of an image that represents characteristics (or attributes) of facial features from the image. In particular, the term "deep visual speech representation" refers to an embedded encoding of an image that represents facial features of speech. As an example, a deep visual speech representation includes a latent vector that embeds latent (or hidden) features representing facial features (of speech) from a digital image. Indeed, the deep visual speech representation can, as a latent vector, include data representing characteristics (or features) of pixels that represent facial features from a digital image (e.g., hidden activation values). In some implementations, while these feature values (of the deep visual speech representation) are not recognizable to a user, they nonetheless characterize the facial features depicted within a digital image.

As used herein, the term "deep visual speech representation cluster" refers to a grouping or cluster represented by a relationship between deep visual speech representations. In particular, the term deep visual speech representation cluster" can include a grouping of deep visual speech representations that share common characteristics or features. For example, a deep visual speech representation cluster includes a grouping of deep visual speech representations that are semantically similar (based on values of the visual speech representations) in a feature space. For instance, a deep visual speech representation cluster includes a group or set of deep visual speech representations that are identified as neighbors utilizing a k-nearest neighbor algorithm.

As further used herein, the term "segmented visemic speech representation" refers to a collective representation of digital video frames that correspond to a visual speech segment from the digital video. In particular, the term segmented visemic speech representation can include a representation generated from multiple digital video frames that are selected using deep visual speech representation clusters to represent a visual speech segment (e.g., that is ultimately mapped to a viseme). In some embodiments, a segmented visemic speech representation includes a combined representation of frames that belong to a segment of visual speech from the digital video as determined using a deep visual speech representation cluster. In one or more instances, the segmented visemic speech representation includes a combination of representations generated using a principal component analysis on frames of a that belong to a segment of visual speech from the digital video.

As further used herein, the term "digital video" refers to a series of visual representations (e.g., a series of digital images that, when rendered in sequence, portray a character speaking). To illustrate, in one or more implementations, a digital video includes, but is not limited to, a digital file with the following file extensions: FLV, SWF, AVI, WMV, MOV, QT, MKV, MP4, or AVCHD. Furthermore, as used herein, the term "frame" (sometimes referred to as "video frame" or "digital video frame") refers to a visual representation of a single portion or instance from a digital video. In particular, in some cases, the term "frame" includes a digital image of a still image which is a segment (or instance) of a video. To illustrate, in some instances, a frame includes a digital image. Indeed, in one or more implementations, a digital image includes, but is not limited to, a digital file with the following extensions: JPG, TIFF, BMP, PNG, RAW, or PDF.

Moreover, as used herein, the term "generative adversarial neural network" (GAN) refers to a machine learning model (e.g., a neural network) that utilizes an adversarial learning process to generate realistic data from an input embedding. In particular, the term "generative adversarial neural network" refers to a machine learning model that generates possible, realistic sequences of visemes for an input embedding (e.g., a segmented visemic speech representation). In one or more embodiments, a GAN is trained to generate data that adversarially attempts to trick a discriminator neural network into classifying the data as authentic data.

In addition, as used herein, the term "discriminator neural network" refers to a machine learning model (e.g., a neural network) that classifies output of a GAN as authentic or not authentic (e.g., real or fake). In particular, in one or more embodiments, the discriminator neural network includes a machine learning model that is trained (using ground truth authenticity labels) to classify data as real (e.g., an authentic viseme sequence drawn from real-world date) or fake (e.g., a generated viseme sequence from a GAN). In one or more implementations, the discriminator neural network includes a machine learning model that is trained, using authentic viseme sequences from a text corpus, to distinguish between authentic and/or not authentic viseme sequences. In addition, in one or more implementations, the discriminator neural network classifies output viseme sequences from a GAN as authentic or not authentic.

Furthermore, as used herein, the term "neural network" refers to a machine learning model that is trained and/or tuned based on inputs to determine classifications or approximate unknown functions. For example, a neural network includes a model of interconnected artificial neurons (e.g., organized in layers) that communicate and learn to approximate complex functions and generate outputs (e.g., generated visual speech representations and/or viseme sequence probabilities) based on a plurality of inputs provided to the neural network. In some cases, a neural network refers to an algorithm (or set of algorithms) that implements deep learning techniques to model high-level abstractions in data. For example, a neural network includes a convolutional neural network (CNN) and/or a recurrent neural network (RNN).

As used herein, the term "viseme" refers to a decomposable unit of representation for visual speech. In particular, in one or more embodiments, the term "viseme" refers to a decomposable unit that represents one or more audible phonemes from a distinct mouth movement corresponding to a particular or a group of sounds. Indeed, in one or more embodiments, a viseme includes a visual movement (e.g., mouth shape or movement) that represents one or more phonemes. In some cases, a viseme represents a distinct mouth movement that maps to one or more particular phonemes (e.g., a first viseme that maps to the phonemes p, b, m and a second viseme that maps to the phonemes t, d). In addition, as used herein, the term "viseme sequence" refers to a set of one or more visemes in a specific order that represent a phrase. For example, the phrases "I love you" and "Elephant Juice" have a viseme sequence of "rstfi." In certain instances, a viseme sequence can include one or more visemes in combination with one or more phonemes that represent the one or more visemes.

As used herein, the term "language decoder" refers to a model (or algorithm) that converts a viseme sequence into words or phrases. In particular, in one or more instances, a language decoder utilizes a viseme sequence from a GAN to determine a probable text sequence for the viseme sequence. In one or more embodiments, the language decoder includes, but is not limited to, a weighted finite-state transducer-based decoder and/or a Viterbi algorithm-based decoder.

As further used herein, the term "electronic transcription" refers to a set of text that represents phrases and/or speech within a digital video. In particular, in one or more embodiments, the term "electronic transcription" refers to an electronic arrangement (e.g., a text document or file) that transcribes speech represented within a digital video (e.g., transcribed speech and the time of speech in relation to the digital video).

Turning now to the figures, FIG. 1 illustrates a schematic diagram of one or more implementations of a system 100 (or environment) in which a visual speech recognition system operates in accordance with one or more implementations. As illustrated in FIG. 1, the system 100 includes server device(s) 102, a network 108, and client devices 110*a*-110*n*. As further illustrated in FIG. 1, the server device(s) 102 and the client devices 110*a*-110*n* communicate via the network 108.

As shown in FIG. 1, the server device(s) 102 include a digital graphics system 104 which further includes the visual speech recognition system 106. The digital graphics system 104 can generate, edit, store, retrieve, and/or enhance digital graphics, such as digital videos and other digital content. Moreover, as explained below, the visual speech recognition system 106 can perform speech recognition tasks in extracting spoken language from digital video (e.g., without corresponding audio). For example, the server device(s) 102 includes, but is not limited to, a computing (or computer) device (as explained below with reference to FIG. 10). In some implementations, the visual speech recognition system 106 determines speech from a digital video utilizing a GAN. In particular, in one or more embodiments, the visual speech recognition system 106 receives a digital video from a client device (of the client devices 110*a*-110*n*) and recognizes speech from a digital video utilizing a GAN model.

Furthermore, as shown in FIG. 1, the system 100 includes the client devices 110*a*-110*n*. In one or more implementations, the client devices 110*a*-110*n* include, but are not limited to, a mobile device (e.g., smartphone, tablet), a laptop, a desktop, or any other type of computing device, including those explained below with reference to FIG. 10. In certain implementations, although not shown in FIG. 1, the client devices 110*a*-110*n* are operated by a user to perform a variety of functions (e.g., via the digital graphics applications 112*a*-112*n*). For example, the client devices 110*a*-110*n* perform functions such as, but not limited to, capturing digital videos, editing digital videos, playing digital videos, and/or requesting speech recognition for digital videos.

To access the functionalities of the visual speech recognition system 106 (as described above), in one or more implementations, a user interacts with one of the digital graphics applications 112*a*-112*n* on the client devices 110*a*-110*n*. For instance, the digital graphics applications 112*a*-112*n* include one or more software applications installed on the client devices 110*a*-110*n* (e.g., to capture, play, and/or modify digital videos in accordance with one or more implementations herein). In some instances, the digital graphics applications 112*a*-112*n* are hosted on the server device(s) 102. In addition, when hosted on the server device(s), the digital graphics applications 112*a*-112*n* are accessed by the client devices 110*a*-110*n* through a web browser and/or another online interfacing platform and/or tool.

Although FIG. 1 illustrates the visual speech recognition system 106 being implemented by a particular component and/or device within the system 100 (e.g., the server device(s) 102), in some implementations, the visual speech recognition system 106 is implemented, in whole or part, by other computing devices and/or components in the system 100. For instance, in some implementations, the visual speech recognition system 106 is implemented on the client devices 110*a*-110*n* within the digital graphics applications 112*a*-112*n*. In particular, in one or more implementations, the description of (and acts performed by) the visual speech recognition system 106 are implemented (or performed by) the client visual speech recognition systems 114*a*-114*n* when the client devices 110*a*-110*n* implement the visual speech recognition system 106. More specifically, in certain instances, the client devices 110*a*-110*n* (via an implementation of the visual speech recognition system 106 on the client visual speech recognition systems 114*a*-114*n*) recognize visual speech from a digital video in accordance with one or more implementations.

In some embodiments, both the server device(s) 102 and the client devices 110*a*-110*n* implement various components of the visual speech recognition system 106. For example, in some embodiments, the server device(s) 102 train one or more neural networks (e.g., a GAN for generating visemes) and then provide the neural networks to the client devices 110*a*-110*n* to implement/apply the neural networks (e.g., to generate visemes for digital images on the client devices 110*a*-110*n*). In some embodiments, the server device(s) 102 train and implement one or more neural networks (e.g., a GAN for generating visemes). To illustrate, the server device(s) 102 train a GAN, receive a digital video from the client device 110*a*, generate visemes (and/or transcription) from the digital video, and provide the visemes (and/or digital video) to the client device 110*a*.

Additionally, as shown in FIG. 1, the system 100 includes the network 108. As mentioned above, in some instances, the network 108 enables communication between components of the system 100. In certain implementations, the network 108 includes a suitable network and may communicate using any communication platforms and technologies suitable for transporting data and/or communication signals, examples of which are described with reference to FIG. 10. Furthermore, although FIG. 1 illustrates the server device(s) 102 and the client devices 110*a*-110*n* communicating via the network 108, in certain implementations, the various components of the system 100 communicate and/or interact via other methods (e.g., the server device(s) 102 and the client devices 110*a*-110*n* communicating directly).

Figure 2:
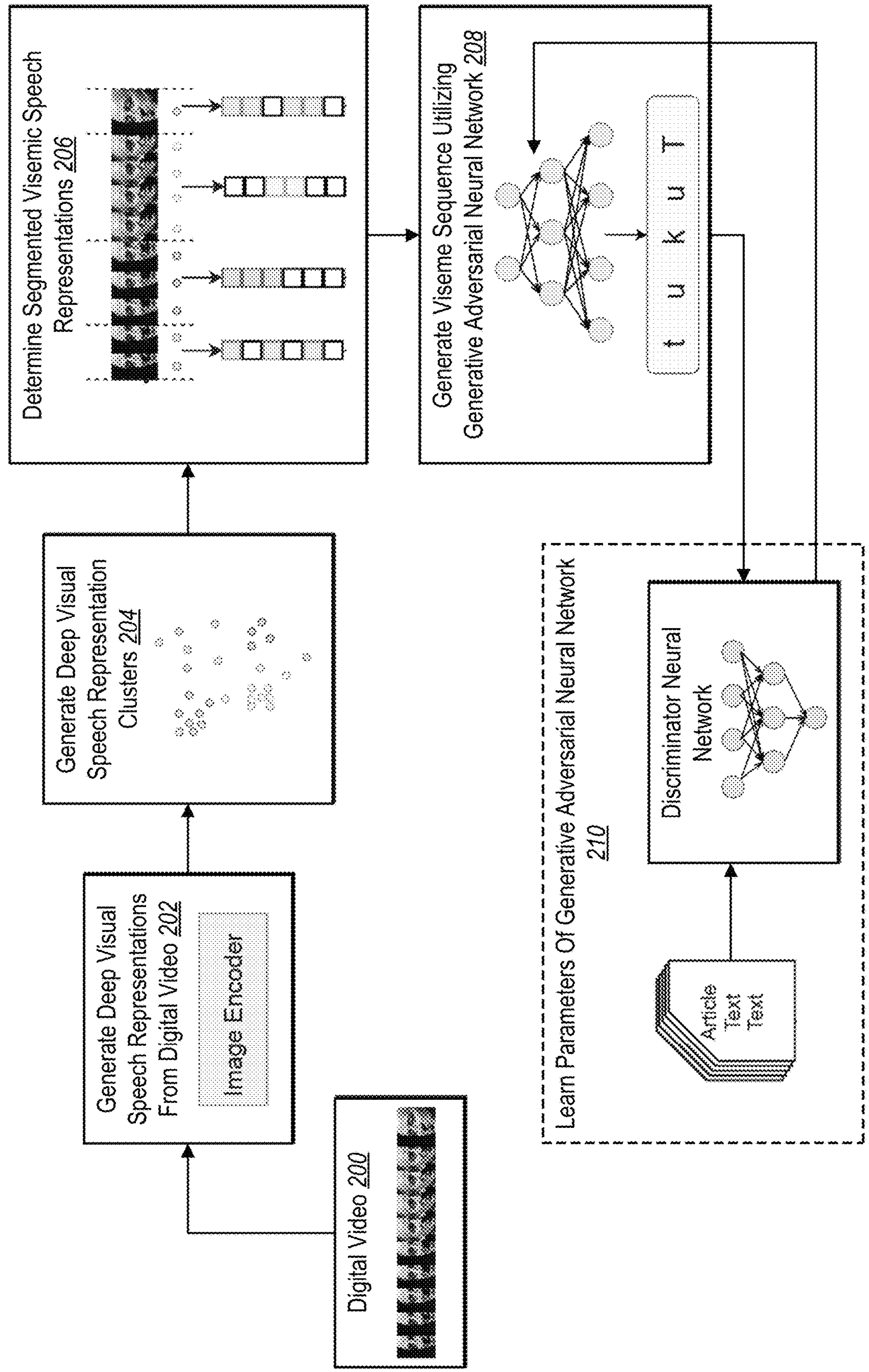
FIG. 2 illustrates an overview of a visual speech recognition system determining visual speech from a digital video by utilizing a GAN-based framework in accordance with one or more implementations.

As previously mentioned, in one or more implementations, the visual speech recognition system 106 utilizes a GAN and self-supervised speech representations of a digital video to recognize visual speech. For example, FIG. 2 illustrates an overview of the visual speech recognition system 106 determining visual speech from a digital video by utilizing the GAN-based framework. As shown in FIG. 2, the visual speech recognition system 106 generates deep visual speech representation clusters from deep visual speech representations generated from a digital video. Then, as further illustrated in FIG. 2, the visual speech recognition system 106 determines segmented visemic speech representations using the deep visual speech representation clusters. Additionally, as shown in FIG. 2, the visual speech recognition system 106 generates viseme sequences by utilizing the segmented visemic speech representations with a GAN (that is trained utilizing a discriminator neural network).

As shown in act 202 of FIG. 2, the visual speech recognition system 106 generates deep visual speech representations from a digital video 200 utilizing an image encoder. In particular, the visual speech recognition system extracts digital video frames from the digital video 200 and utilizes the image encoder to generate deep visual speech representations for the digital video frames. Additional detail regarding generating deep visual speech representations is described below (e.g., in reference to FIG. 3).

Furthermore, as shown in act 204 of FIG. 2, the visual speech recognition system 106 also generates deep visual speech representation clusters. In particular, the visual speech recognition system 106 utilizes a clustering algorithm to cluster the deep visual speech representations generated at the act 202. Additional detail regarding generating deep visual speech representation clusters using various clustering approaches is described below (e.g., in reference to FIG. 3).

Upon generating the deep visual speech representation clusters, as shown in act 206 of FIG. 2, the visual speech recognition system 106 determines segmented visemic speech representations. In particular, in some instances, the visual speech recognition system 106 utilizes the deep visuals speech representation clusters to identify speech segment boundaries. Utilizing these speech segment boundaries and the deep visual speech representation clusters, the visual speech recognition system can identify different groups of digital video frames from the digital video 200 that portray particular visemes. The visual speech recognition system can then generate segmented visemic speech representations from these different groups. Additional detail regarding determining segmented visemic speech representations is described below (e.g., in reference to FIG. 3).

Furthermore, as shown in act 208 of FIG. 2, the visual speech recognition system 106 generates viseme sequences utilizing a GAN. In particular, in one or more embodiments, the visual speech recognition system 106 utilizes the segmented visemic speech representations (from the act 206) as input for the GAN to generate viseme sequences for the segmented visemic speech representations. Furthermore, in one or more embodiments, the visual speech recognition system 106 utilizes the viseme sequences to generate electronic transcriptions for the digital video 200. For example, additional detail regarding generating viseme sequences utilizing a GAN (and generating electronic transcriptions) is described below (e.g., in reference to FIGS. 4 and 5).

In addition, as shown in act 210 of FIG. 2, the visual speech recognition system 106 can also learn parameters of the GAN. As illustrated in the act 210 of FIG. 2, the visual speech recognition system 106 utilizes a discriminator neural network with the generated viseme sequence to learn parameters of the GAN. Additionally, as shown in FIG. 2, the visual speech recognition system 106 trains a discriminator neural network by analyzing viseme sequences generated by the GAN (e.g., fake viseme sequences) and viseme sequences from a text corpus (e.g., authentic viseme sequences). Additional detail regarding training a discriminator neural network and a GAN is described below (e.g., in reference to FIGS. 6 and 7).

Figure 3:
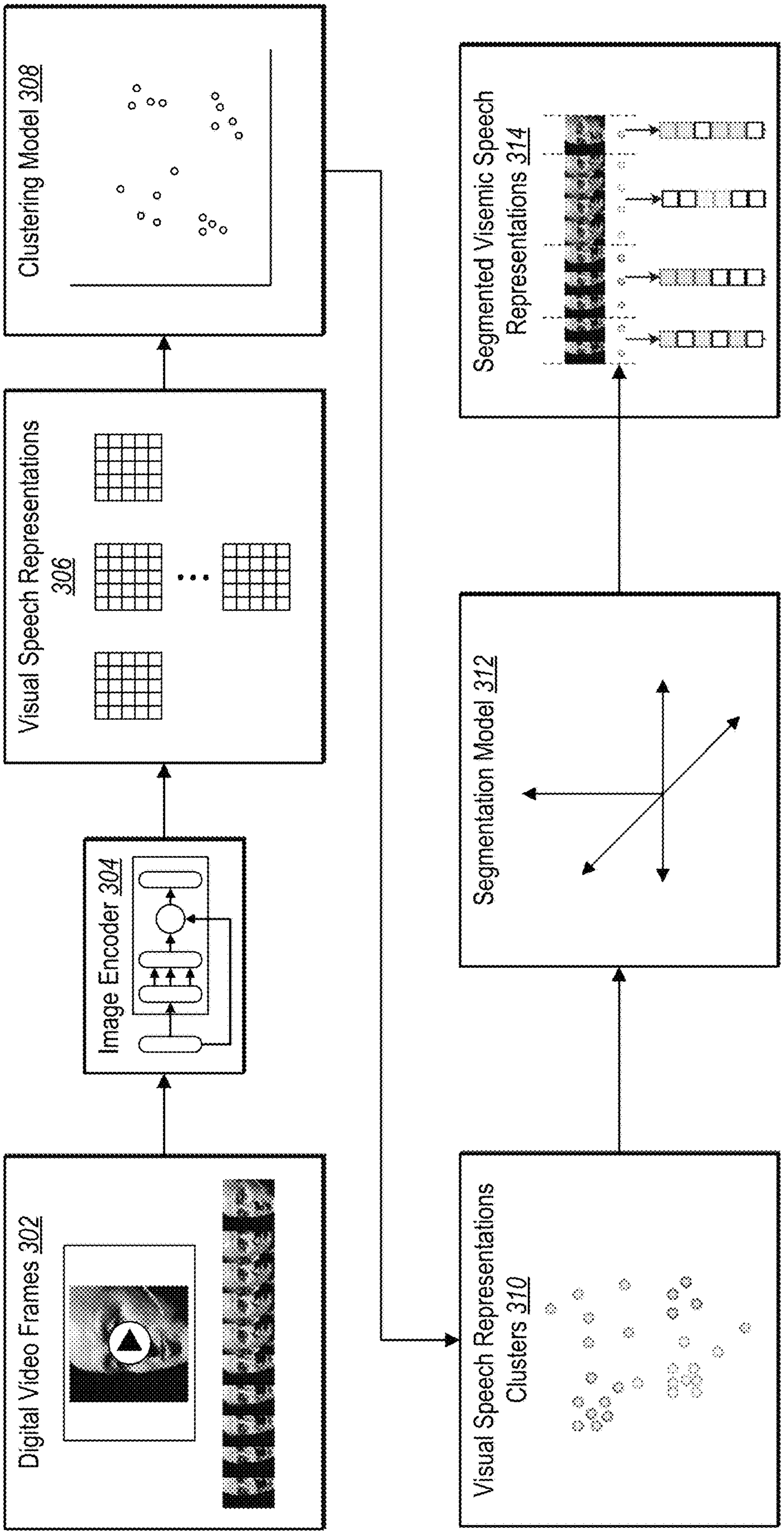
FIG. 3 illustrates a visual speech recognition system generating visual speech representations from a digital video in accordance with one or more implementations.

As previously mentioned, in some cases, the visual speech recognition system 106 determines segmented visemic speech representations from a digital video. For example, FIG. 3 illustrates the visual speech recognition system 106 generating visual speech representations from a digital video. Subsequently, FIG. 3 also illustrates the visual speech recognition system 106 determining segmented visemic speech representations from clusters of the visual speech representations.

To illustrate, as shown in FIG. 3, the visual speech recognition system 106 utilizes an image encoder 304 to generate visual speech representations 306 from digital video frames 302 (of a digital video). For instance, the visual speech recognition system 106 can, utilizing the image encoder 304, generate visual speech representations that are embedded encodings that represent characteristics of facial features from digital video frames. In one or more implementations, the visual speech recognition system 106 generates a visual speech representation for each digital frame of the digital video.

In one or more embodiments, the visual speech recognition system 106 utilizes an image encoder to generate deep embeddings (e.g., deep visual speech representations) from a digital video frame (e.g., an image) that capture facial features portrayed in the image. In one or more instances, the visual speech recognition system 106 utilizes a transformer-based image encoder that utilize patches of an image (e.g., as a vector or matrix) with a transformer encoder to generate deep embeddings. For example, in one or more embodiments, the visual speech recognition system 106 utilizes a transformer-based image encoder (e.g., Vision Transformer) as described by A. Dosovitskiy et al. in *An Image is Worth* 16×16 *Words: Transformers for Image Recognition at Scale*, arXiv:2010.11929v2, (2021), the content of which is hereby incorporated by reference in its entirety. In addition, in some embodiments, the visual speech recognition system 106 also utilizes a transformer-based image encoder as described by Z. Liu et al. in *Swin Transformer: Hierarchical Vision Transformer using Shifted Windows*, arXiv:2103.14030v2, (2021), the content of which is hereby incorporated by reference in its entirety.

Although one or more embodiments of the visual speech recognition system 106 utilize a transformer-based image encoder to generate deep visual speech representations, the visual speech recognition system 106 can utilize various image encoders for the image encoder 304. For example, the visual speech recognition system 106 utilizes a neural network-based image encoder to generate deep visual speech representations from digital video frames. In particular, in one or more embodiments, the visual speech recognition system 106 utilizes a convolutional neural network (CNN) such as, but not limited to, ImageNet and/or AlexNet to generate deep visual speech representations from digital video frames.

Furthermore, as illustrated in FIG. 3, the visual speech recognition system 106 generates visual speech representation clusters 310 from the visual speech representations 306 utilizing a clustering model 308. In particular, in some cases, the visual speech recognition system 106 utilizes the clustering model 308 to identify and group similar visual speech representations from the digital video as clusters. For instance, the visual speech representation clusters 310 indicate individual speech segments of a digital video (e.g., a cluster of frames that include characteristics indicating a similar depicted viseme). In some cases, the visual speech recognition system 106 further labels each digital video frame with a cluster identity based on the cluster in which the visual speech representation of a particular digital video frame belongs.

In one or more embodiments, the visual speech recognition system 106 utilizes a k-mean clustering algorithm to generate the visual speech representation clusters 310. In particular, the visual speech recognition system 106 utilizes the k-mean clustering algorithm to determine distances between the visual speech representations 306 and a selected class (or attribute) (e.g., a cluster that represents a class such as, but not limited to, facial features of lip movement and/or mouth movement) in a feature space for a select number (e.g., a k number) of clusters. Furthermore, in some embodiments, the visual speech recognition system 106 utilizes a distance value that includes a value that represents the amount of space between a visual speech representation and a center of a cluster within a feature space. Furthermore, in some cases, the visual speech recognition system 106 utilizes the distance value as one or more values representing quantifications of similarities between a plurality of features of the visual speech representations. For instance, a distance value includes a value that represents the amount of space between neighboring visual speech representations within a cluster (e.g., based on a feature space of the cluster). In one or more embodiments, the visual speech recognition system 106 generates visual speech representation clusters utilizing clustering techniques such as, but not limited to, K-means clustering, recursive K-means clustering, and/or differential clustering.

Moreover, as illustrated in FIG. 3, the visual speech recognition system 106 further determines segmented visemic speech representations 314 from the visual speech representation clusters 310. In particular, as shown in FIG. 3, the visual speech recognition system 106 utilizes a segmentation model 312 to identify speech segment boundaries from the visual speech representation clusters 310 to identify groupings of digital video frames. Then, in reference to FIG. 3, the visual speech recognition system 106 generates a segmented visemic speech representation utilizing visual representations of the digital video frames from the groupings of digital video frames.

For example, the visual speech recognition system 106 determines speech segment boundaries utilizing the visual speech representation clusters. In one or more embodiments, the visual speech recognition system 106 utilizes the visual speech representation clusters to label each digital video frame with a cluster identifier. Then, in some cases, the visual speech recognition system 106 identifies a digital video frame in which the cluster identifier changes (e.g., indicating that the subsequent video frame belongs to another cluster that represents a separate viseme segment within the digital video). Upon identifying the digital video frame with the changed cluster identifier, in some instances, the visual speech recognition system 106 labels video frame as a speech segment boundary.

Indeed, in one or more embodiments, the visual speech recognition system 106 continues to identify changes in cluster identifiers from the digital video frames to label the subsequent speech segment boundaries. In one or more embodiments, the visual speech recognition system 106 determines a sequence of speech segments having varying numbers of digital video frames in each segment. As an illustrative example, the visual speech recognition system 106 determines that five of the first ten digital video frames belong to a first cluster. The visual speech system 106 can assign al ten digital video frames (five from the cluster and from not from the cluster) to a first speech segment. Moreover, as part of the example, the visual speech recognition system 106 determines that seven of the next twelve digital video frames belong to a second cluster and according belong to a second speech segment. Indeed, in some cases, the visual speech recognition system 106 identifies various numbers of speech segments having various numbers of digital video frames.

Subsequently, in one or more embodiments, the visual speech recognition system 106 generates a segmented visemic speech representation from the various speech segments (from the visual speech representation clusters). In particular, in one or more embodiments, the visual speech recognition system 106 generates visual speech representations of digital video frames belonging to a speech segment and combines the visual speech representations to determine a segmented visemic speech representation. For example, the visual speech recognition system 106 generates a visual speech representation for each digital video frame in a speech segment using a machine learning transformation technique.

To illustrate, in some embodiments, the visual speech recognition system 106 utilizes a principal component analysis, as the machine learning transformation technique, to generate visual speech representations from the digital video frames belonging to a speech segment. In particular, in some cases, the visual speech recognition system 106 utilizes a principal component analysis to transform correlated variables of a digital video frame into a reduced number of uncorrelated variables to generate the visual speech representation. Indeed, in one or more embodiments, the visual speech representation of a digital video frame includes a reduced linear dimension version of the digital video frame (e.g., using principal component analysis). Although one or more embodiments illustrates the visual speech recognition system 106 utilizing a principal component analysis technique, the visual speech recognition system 106, in some cases, utilizes various machine learning transformation techniques such as, but not limited to, linear discriminant analysis, autoencoders, and/or locally linear embedding methods.

Moreover, in some instances, the visual speech recognition system 106 utilizes the visual speech representations in a speech segment to determine the segmented visemic speech representation. For example, the visual speech recognition system 106 combines the visual speech representations corresponding to digital video frames of a speech segment to generate the segmented visemic speech representation for the speech segment. In one or more embodiments, the visual speech recognition system 106 combines the visual speech representations utilizing a mean pooling of the visual speech representations to generate the segmented visemic speech representation. Indeed, in one or more embodiments, the visual speech recognition system 106 utilizes various techniques to combine the visual speech representations such as, but not limited to, max pooling, global mean pooling, averaging, and/or multiplication.

To illustrate, in some cases, the visual speech recognition system 106 utilizes a first set of visual speech representations from a first speech segment (having a first group of digital video frames) to generate a first segmented visemic speech representation. Moreover, in one or more embodiments, the visual speech recognition system 106 utilizes a second set of visual speech representations from a second speech segment (having a second group of digital video frames) to generate a second segmented visemic speech representation. Indeed, in some cases, the visual speech recognition system 106 determines segmented visemic speech representations for each speech segment identified from the digital video using the visual speech representation clusters to result in a sequence of segmented visemic speech representations $S=s_1, s_2, \ldots, s_T$ for a particular utterance S (as depicted in a digital video).

Figure 4:
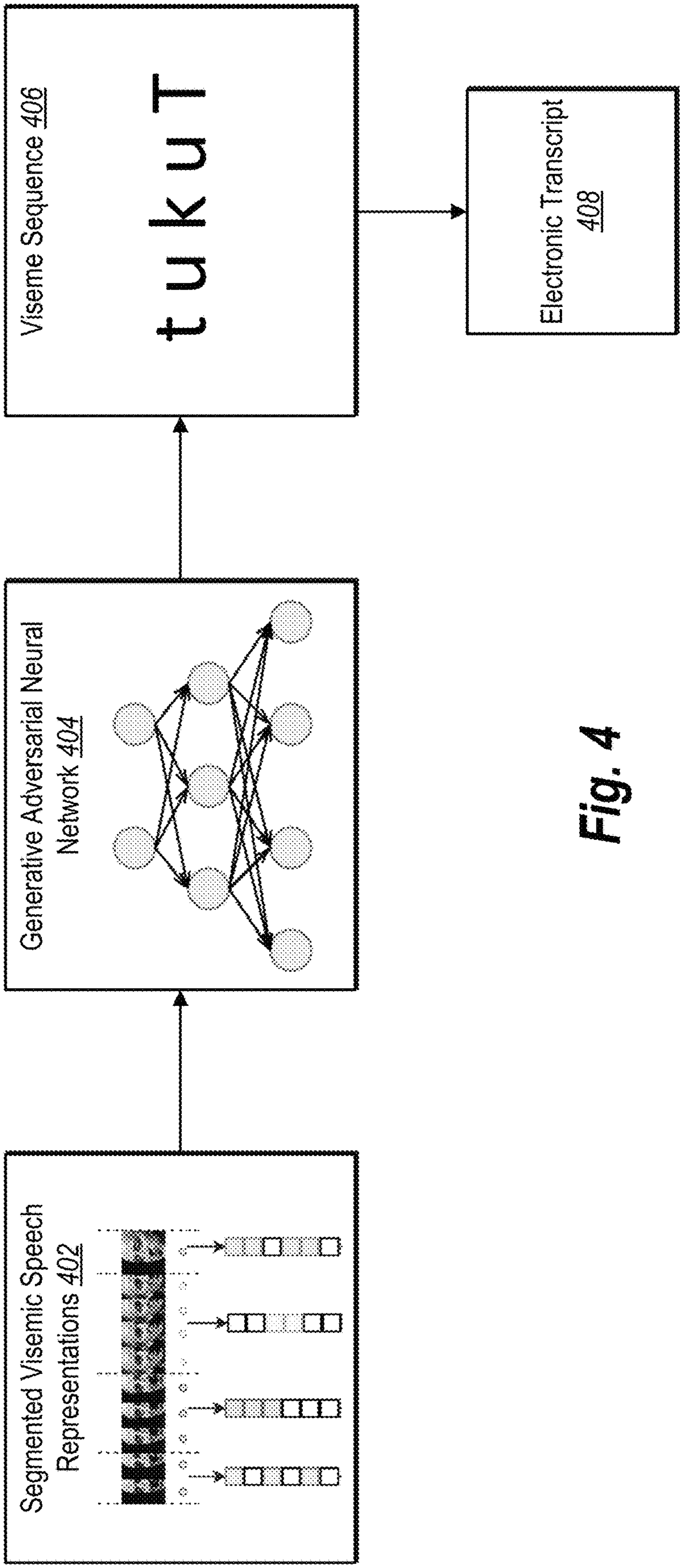
FIG. 4 illustrates a visual speech recognition system utilizing segmented visemic speech representations with a GAN to generate viseme sequences in accordance with one or more implementations.

As previously mentioned, the visual speech recognition system 106, in some embodiments, utilizes a GAN with segmented visemic speech representations to generate viseme sequences. For example, FIG. 4 illustrates the visual speech recognition system 106 utilizing segmented visemic speech representations with a GAN to generate viseme sequences. As shown in FIG. 4, the visual speech recognition system 106 provides segmented visemic speech representations 402 to a GAN 404. Indeed, as further shown in FIG. 4, the GAN 404 maps the segmented visemic speech representations to visemes to generate the viseme sequence 406. As further shown in FIG. 4, the visual speech recognition system 106 utilizes the viseme sequence 406 to generate an electronic transcript 408 for a digital video corresponding to the segmented visemic speech representations 402.

In relation to FIG. 4, the GAN 404 is trained to generate possible sequences of visemes from input visual speech embeddings (e.g., the segmented visemic speech representations). The GAN 404 (i.e., a generator G) maps the sequence of segmented visemic speech representations $S=s_1, s_2, \ldots, s_T$ to viseme representations $V=v, v_2, \ldots, v_L$. Indeed, in one or more embodiments, the generator G generates one viseme per segmented visemic speech representation. In some instances, the visual speech recognition system 106 further combines subsequent viseme predictions when generator G generates the same viseme back-to-back (e.g., to ensure that $L \leq T$).

The GAN 404 can include a variety of architectures. For example, in relation to the GAN 404 can include a 1-dimensional (1-D) layer convolutional neural network. In addition, in one or more embodiments, the GAN 404 has a linear layer that classifies visemes from the segmented visemic speech representations. The visual speech recognition system 106 provides the GAN 404 with an m number of input segmented visemic speech representations. The input segmented visemic speech representations can include various sizes (e.g., 256, 512, 1024). Furthermore, the GAN 404 via the 1-D layer convolutional neural network and the linear layer outputs a viseme distribution (e.g., a distribution of visemes with classification probabilities). Then, in some embodiments, the visual speech recognition system 106 determines a viseme classification for the input segmented visemic speech representation from the viseme distribution.

In some cases, the visual speech recognition system 106 utilizes a softmax layer to generate a viseme distribution output from the GAN 404. In particular, the visual speech recognition system 106 utilizes a softmax technique to mimic authentic one-hot encoded viseme representations. In some cases, the softmax layer prevents the GAN 404 from learning sharp viseme distributions (e.g., extreme high confidence for one viseme class). In some instances, the visual speech recognition system 106 utilizes a gumbel-softmax layer to generate the viseme distribution output from the GAN 404.

In one or more embodiments, the visual speech recognition system 106 generates a viseme sequence for visual speech of an entire digital video. In some instances, the visual speech recognition system 106 generates multiple viseme sequences for a digital video that represent multiple segments of the digital video. As an example, the visual speech recognition system 106 determines a viseme sequence for individual phrases or sentences in a digital video or for individual portions of the digital video.

Figure 5:
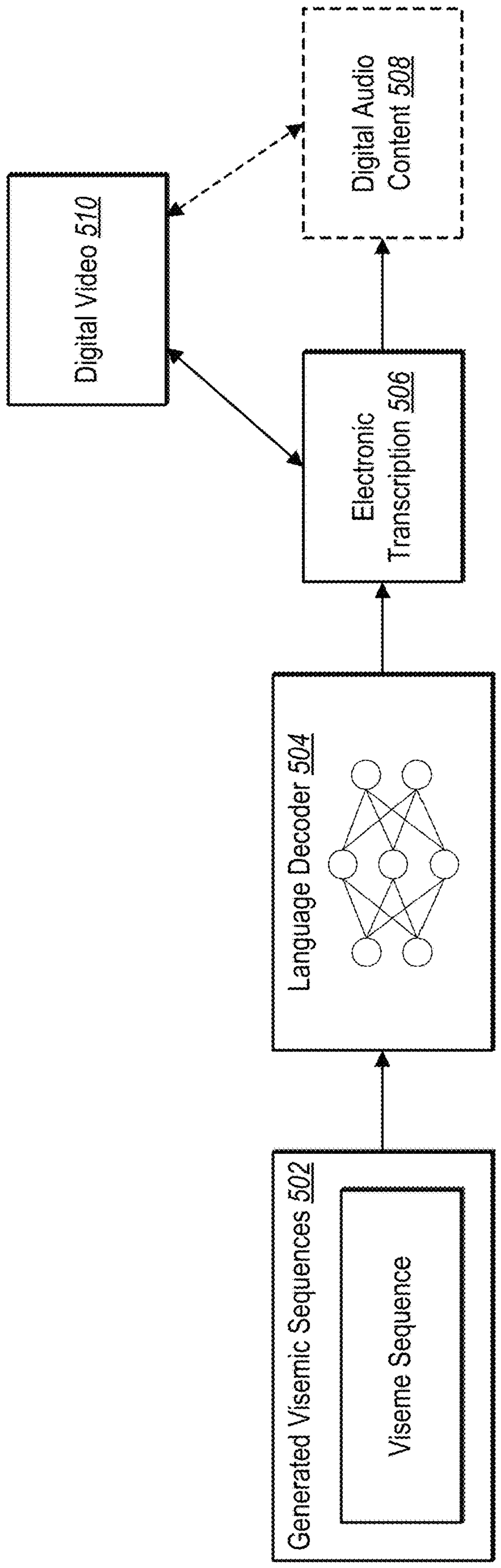
FIG. 5 illustrates a visual speech recognition system utilizing a language decoder to generate an electronic transcription from a viseme sequence in accordance with one or more implementations.

Furthermore, as previously mentioned and as shown in FIG. 4, the visual speech recognition system 106 utilizes the GAN 404 to generate a viseme sequence for the segmented visemic speech representations and subsequently generate an electronic transcript 408 that represents speech portrayed within the digital video. Indeed, FIG. 5 illustrates the visual speech recognition system 106 utilizing a language decoder 504 to generate an electronic transcription 506 for a digital video 510 from a viseme sequence 502 that is generated for the digital video 510. Additionally, as shown in FIG. 5, in some embodiments, the visual speech recognition system 106 further utilizes the electronic transcription 506 to generate digital audio content 508 for the speech portrayed within the digital video 510.

In particular, the visual speech recognition system 106 utilizes the language decoder 504 (e.g., for automatic speech recognition) to determine a probable text sequence from the viseme sequence generated by the GAN. The visual speech recognition system 106 trains the language decoder 504 as a viseme level language decoder (e.g., a 6-gram visemic language model). For instance, the visual speech recognition system 106 utilizes a language decoder that is trained (or modeled) using visemic language model (generated or prepared) from a text corpus. In one or more embodiments, the visual speech recognition system 106 utilizes the language encoder to determine an optimal path of visemes (e.g., in polynomial time) utilizing a decoding algorithm (e.g., a Viterbi algorithm). In some embodiments, the visual speech recognition system 106 adds self loops to fill blank viseme sequences with a label (e.g., to differentiate between blanks and spaces).

In certain embodiments, the visual speech recognition system 106 trains the language decoder 504 as a word level language decoder. For example, the visual speech recognition system 106 trains a language model utilizing one or more text corpuses to decode text using beam search (e.g., using various beam widths such as 4.0 words, 5.0 words, 6.0 words). In one or more embodiments, the visual speech recognition system 106 generates electronic transcriptions from generate viseme sequences utilizing a word level language decoder with comparable results while using a language decoder that is trained using a large volume of preprocessed text (e.g., 8 or more gigabytes of data) and a language decoder that is trained using a smaller amount of preprocessed text (e.g., 2 or less gigabytes of data).

In one or more embodiments, the visual speech recognition system 106 utilizes a weighted finite-state transducer (WFST)-based language decoder as the language decoder 504. Indeed, in one or more embodiments, the visual speech recognition system 106 utilizes a WFST decoder that utilizes transducers to model the likelihood of a word sequence (e.g., from visemes or phonemes of visemes). In some instances, the visual speech recognition system 106 utilizes a WFST decoder that further utilizes a finite state machine to provide weights to various paths that are utilized for a viseme sequence. Indeed, in some cases, the visual speech recognition system 106 utilizes the WFST decoder to decode viseme states into a grammatically-sound word sequence (e.g., to generate the electronic transcription). Furthermore, in one or more embodiments, the visual speech recognition system 106 utilizes various WFST-based language decoders such as, but not limited to, a WFST-based language decoder using Viterbi decoding, WFST-based language decoders that utilize semirings, WFST-based language decoders that utilize various operators (e.g., sum, product, closure, reversal, inversion).

In one or more embodiments, the visual speech recognition system 106 utilizes the output of a WFST-based language decoder to determine whether weights in a latest epoch improved compared to previous epochs. Indeed, the visual speech recognition system 106 utilizes this metric to determine the likelihood of an output sentence to appear in the language. For example, the visual speech recognition system 106 utilizes Viterbi model outputs $$\{V_j\}_{j=1}^{N_s},$$

word-based outputs of the WFST-based language decoder $$\{\overline{V}_j\}_{j=1}^{N_s},$$

and an entropy of the language model $H_{LM}(\overline{V}_j)$ (e.g., which indicates the likelihood of a sentence appearing in the language) with a tunable hyperparameter μ to train the WFST-based language decoder. In particular, the visual speech recognition system 106 utilizes the output of a WFST-based language decoder to minimize the following unsupervised metric:

$$\sum_{j=1}^{N_s} H_{LM}(\overline{V}_j) \times \max(ED(\overline{V}_j, V_j), \mu) \tag{1}$$

In some cases, upon generating an electronic transcription for a digital video, the visual speech recognition system 106 also generates digital audio content for the digital video. In some cases, the visual speech recognition system 106 utilizes a computerized speech model (e.g., artificial intelligence, speech reading algorithm) to create audio content for the text of the electronic transcription. Then, in some implementations, the visual speech recognition system 106 overlays the audio content within the digital video in a target playback time as indicated by the electronic transcription. Specifically, the visual speech recognition system 106 can determine timestamps corresponding to the audio and electronic transcript based on digital frames utilized to generate the segmented visemic speech representations mapped to the visemes and corresponding words of the electronic transcript. The visual speech recognition system 105 can align the timestamps of the audio/electronic transcript with timestamps of digital frames of the digital video. Thus, the visual speech recognition system 106 can align generated digital audio to digital frames of the digital video.

Furthermore, in one or more embodiments, the visual speech recognition system 106 determines visual speech from digital videos for various purposes. To illustrate, upon generating an electronic transcription for a digital video that is missing audio, the visual speech recognition system 106, in some instances, utilizes the electronic transcription to introduce lost speech from the digital video. For example, the visual speech recognition system 106 reconstructs lost audio of a character speaking (as portrayed in a digital video) by recognizing the visual speech of the character (as described above) and generating an electronic transcription of the visual speech.

Additionally, in some instances, the visual speech recognition system 106 also recognizes visual speech (as described above) to automatically add audio content to animated movies in various languages. Furthermore, in one or more instances, the visual speech recognition system 106 utilizes the visual speech recognition framework to generate audio content for digital videos that have noisy, missing, and/or corrupted audio. In some cases, the visual speech recognition system 106 utilizes the visual speech recognition framework to repair (via electronic transcriptions and audio content) noisy, missing, and/or corrupted audio feeds of video conference calls.

Furthermore, in some embodiments, the visual speech recognition system 106 utilizes the visual speech recognition GAN in combination with an audio recognition model to recognize both visual speech and audible speech from a digital video. In particular, in one or more embodiments, the visual speech recognition system 106 utilizes an audio encoder to generate audio representations from the digital video. Then, in some implementations, the visual speech recognition system 106 clusters the audio representations and utilize the clustered audio representations to generate viseme (or phoneme) sequences and electronic transcriptions from the audio representations utilizing a GAN in accordance with one or more embodiments herein. In some cases, the visual speech recognition system 106 utilizes a combination of the viseme sequences generated from the visual speech representations and the viseme sequences generated from the audio representations to generate an electronic transcription for the digital video.

As previously mentioned, the visual speech recognition system 106 utilizes a discriminator neural network to learn parameters of the GAN. Indeed, in one or more embodiments, the visual speech recognition system 106 trains the discriminator neural network to discriminate between authentic and inauthentic/generated viseme sequences (e.g., as real or fake). For example, FIG. 6 illustrates the visual speech recognition system 106 training the discriminator neural network utilizing authentic viseme sequences from a text corpus.

Figure 6:
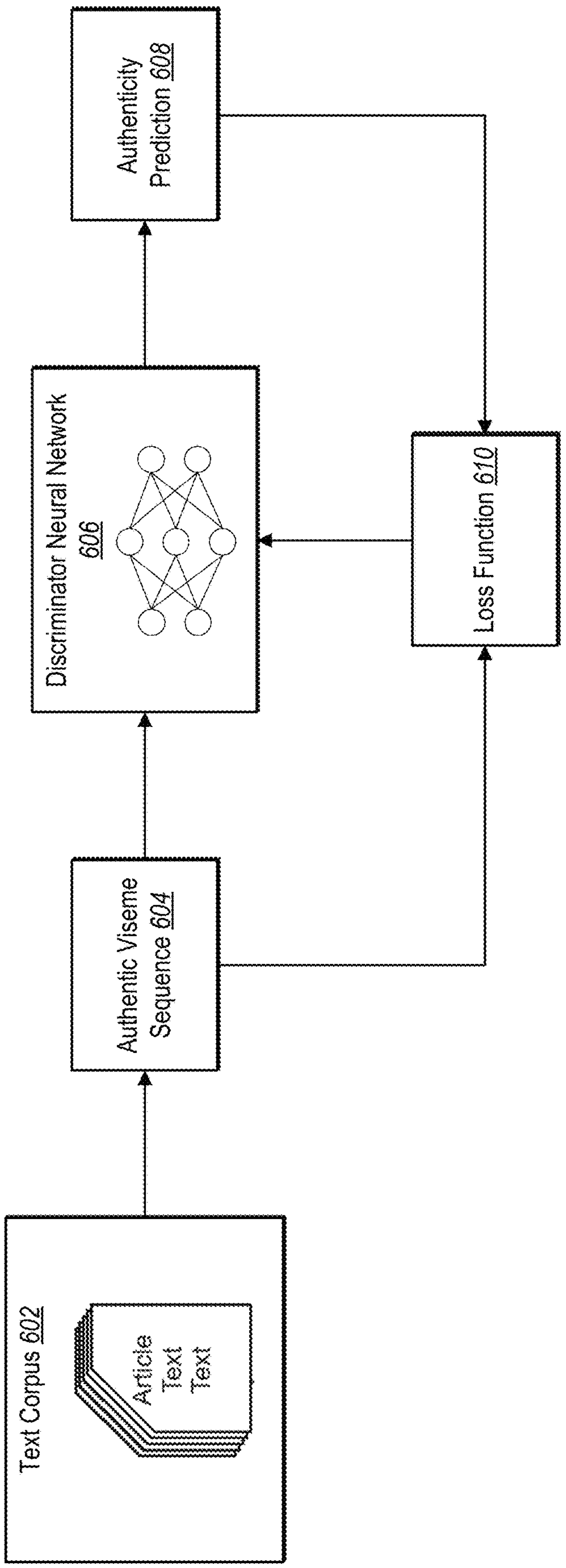
FIG. 6 illustrates a visual speech recognition system training a discriminator neural network in accordance with one or more implementations.

As shown in FIG. 6, the visual speech recognition system 106 identifies an authentic viseme sequence 604 from a text corpus 602. Then, as shown in FIG. 6, the visual speech recognition system 106 inputs the authentic viseme sequence 604 into the discriminator neural network 606 to generate an authenticity prediction 608. Indeed, the authenticity prediction indicates whether the authentic viseme sequence 604 is predicted to be real or fake (e.g., a viseme sequence from the text corpus or a viseme sequence from the GAN).

As further shown in FIG. 6, the visual speech recognition system 106 compares the authenticity prediction 608 with the authentic viseme sequence 604 (as a ground truth label) to determine a loss using a loss function 610. Indeed, the loss function 610 indicates the accuracy of the discriminator neural network 606 (e.g., generating a loss value to indicate that the authenticity prediction 608 is incorrect and/or correct in comparison to the authenticity of the authentic viseme sequence 604). Moreover, in some instances, the visual speech recognition system 106 utilizes the loss determined from the loss function 610 to learn parameters of the discriminator neural network 606. For instance, the visual speech recognition system 106 modifies the parameters of the discriminator neural network 606 to account for the incorrect (or correct) behavior indicated by the loss function 610 (e.g., using back propagation) and to learn to accurately distinguish between real and fake viseme sequences.

In some embodiments, the visual speech recognition system 106 utilizes a text corpus to train the discriminator neural network. Indeed, in one or more implementations, the text corpus includes a data source such as online articles, encyclopedias, dictionaries, and/or news articles. Indeed, in some instances, the visual speech recognition system 106 obtains text phrases from the text corpus and convert the text phrase into a viseme sequence (e.g., as the authentic viseme sequence). For example, the visual speech recognition system 106 converts phonemes of the text phrases from the text corpus into viseme sequences using various viseme conversion techniques (e.g., Epitran, Amazon Polly). In some instances, the visual speech recognition system 106 converts the entire text corpus into a viseme sequence corpus and utilizes the viseme sequence corpus to train the discriminator neural network.

Figure 7:
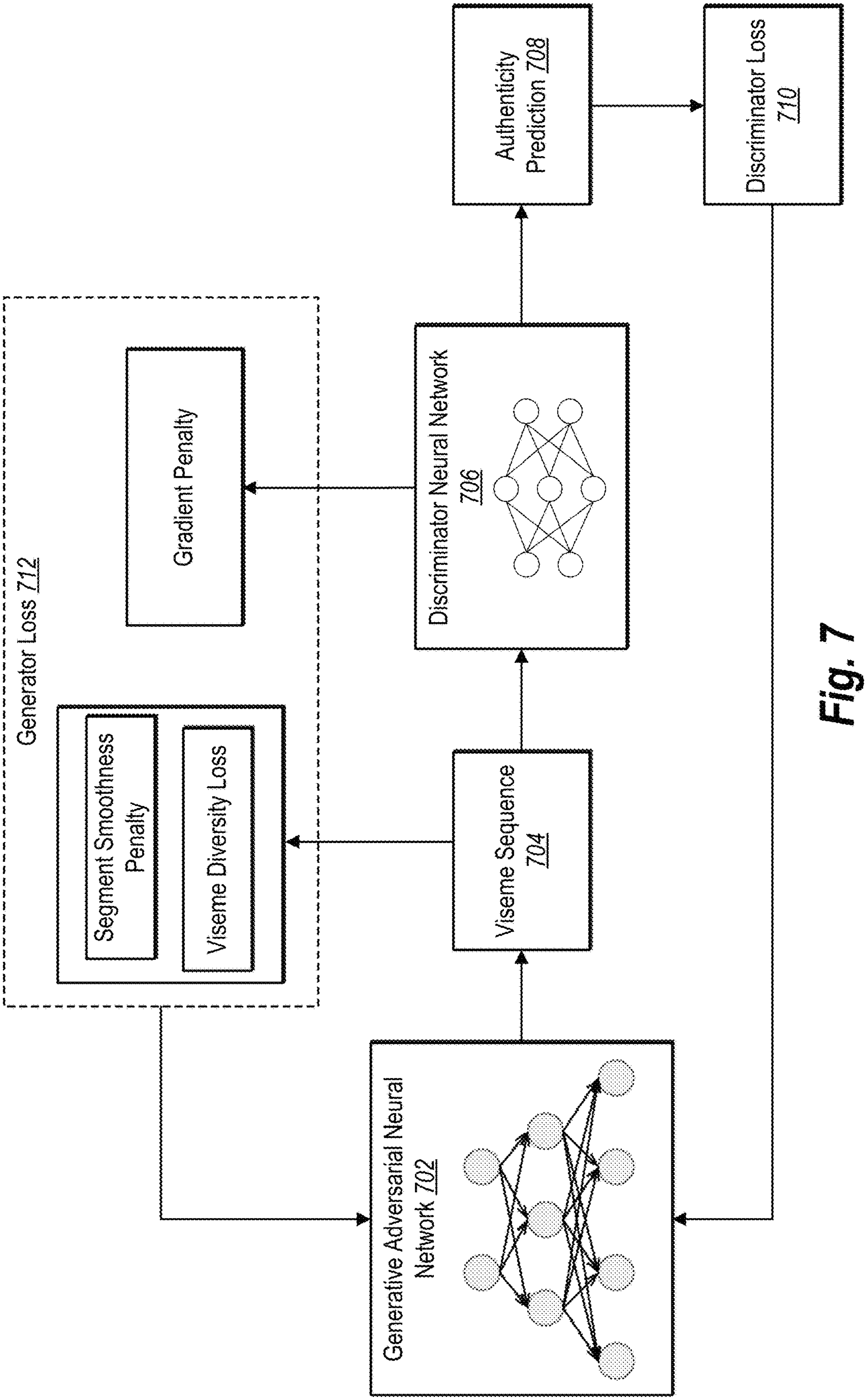
FIG. 7 illustrates a visual speech recognition system training a GAN to generate viseme sequences in accordance with one or more implementations.

As mentioned above, in some cases, the visual speech recognition system 106 trains a GAN to generate viseme sequence predictions from visual speech representations adversarially using a discriminator neural network. For example, FIG. 7 illustrates the visual speech recognition system 106 training a GAN (and further training the discriminator neural network). As shown in FIG. 7, the GAN 702 generates a viseme sequence 704. Then, as further shown in FIG. 7, the visual speech recognition system 106 provides the viseme sequence 704 to a discriminator neural network 706 (e.g., the discriminator neural network 606) to generate an authenticity prediction 708. In particular, the authenticity prediction 708 indicates whether the generated viseme sequence 704 is predicted to be real or fake.

The visual speech recognition system 106 compares the authenticity prediction 708 to a ground truth label of the viseme sequence 704 (e.g., a label indicating that the viseme sequence 704 is fake). For example, as illustrated, the visual speech recognition system 106 utilizes a discriminator loss 710 based on the authenticity prediction 708 and a ground truth label to determine a measure of loss. The visual speech recognition system 106 then utilizes the measure of loss to learn parameters of the GAN 702 (e.g., using backpropagation to reduce the measure of loss). In this manner, the GAN 702 learns to generate more realistic viseme sequences (e.g., that are more likely to fool the discriminator neural network 705). Furthermore, although not illustrated, the visual speech recognition system 106 can also utilize the discriminator loss 710 to further modify parameters of the discriminator neural network 706 (e.g., such that the discriminator neural network more accurately discriminates between real and fake viseme sequences).

In addition, as shown in FIG. 7, the visual speech recognition system 106 also utilize a generator loss 712 with the GAN 702 to learn parameters of the GAN 702. Indeed, as shown in FIG. 7, the generator loss 712 is backpropagated to the GAN 702. Then, as shown in FIG. 7, the visual speech recognition system 106 utilizes the generator loss 712 (and the discriminator loss 710) to modify parameters of the GAN 702 to train the GAN 702 to generate accurate viseme sequences from segmented visemic speech representations. As further shown in FIG. 7, the generator loss 712 includes a segment smoothness penalty, a viseme diversity loss, and/or a gradient penalty (as described below). Although one or more embodiments illustrates a generator loss including a segment smoothness penalty, a viseme diversity loss, and/or a gradient penalty, the generator loss, in some embodiments, includes various combinations of these losses.

In one or more embodiments, the visual speech recognition system 106 utilizes a generator loss and discriminator loss through a mini-max loss formulation. In particular, in some cases, the visual speech recognition system 106 determines a GAN mini-max loss from the generated viseme sequence and the discriminator neural network and utilize the GAN mini-max loss to modify the GAN (e.g., via backpropagation). For example, the visual speech recognition system 106 can, for a discriminator $\mathcal{D}$ and a generator G with a number of viseme samples $\tilde{V} \in \mathcal{V}$ and speech segment representations S, generate a mini-max loss as described in the following function:

$$\min_{G}\max_{D} \mathbb{E}_{\tilde{V}\sim\mathcal{V}}[\log\mathcal{D}(\tilde{V})] - \mathbb{E}_{S\sim\mathcal{S}}[\log(1-D(\mathcal{G}(S)))] \tag{2}$$

In some instances, as shown in FIG. 7, the visual speech recognition system 106 utilizes a gradient penalty loss as part of the generator loss 712. For example, the visual speech recognition system 106 utilizes a gradient penalty loss to stabilize training of the GAN on a random number of viseme samples $\tilde{V} \in \mathcal{V}$. Indeed, in some cases, the gradient penalty loss includes a norm penalty of gradient of a discriminator neural network with respect to the input of the discriminator neural network. For example, the visual speech recognition system 106 can, for a discriminator $\mathcal{D}$, utilize the following gradient penalty loss function (as part of the mini-max loss function (2)) to determine a gradient penalty loss $\mathcal{L}_{gp}$:

$$\mathcal{L}_{gp} = \mathbb{E}_{\tilde{V}\sim\mathcal{V}}[(\|\nabla\mathcal{D}(\tilde{V})\|-1)^2] \tag{3}$$

In addition, in some implementations, as shown in FIG. 7, the visual speech recognition system 106 utilizes a segment smoothness penalty loss as part of the generator loss 712. For instance, the visual speech recognition system 106 utilizes a segment smoothness penalty loss that avoids sudden changes in visemes in subsequent segmented visemic speech representations. Indeed, in one or more embodiments, the visual speech recognition system 106 utilizes the segment smoothness penalty loss to account for improbable sudden changes in the structure of mouth, lips, and vocal cords that do not allow for sudden changes in visemes and to reduce noise (e.g., from correlated segments in subsequent time steps ($v_t$, $v_{t+1}$)). To illustrate, the visual speech recognition system 106 can, for visemes v at subsequent time steps and a generator G, utilize the following segment smoothness penalty loss function (as part of the mini-max loss function (2)) to determine a segment smoothness penalty loss $\mathcal{L}_{sp}$:

$$\mathcal{L}_{sp} = \sum_{(v_t, v_{t+1})\in\mathcal{G}(S)} \|v_t - v_{t+1}\|^2 v_t \in \mathcal{V} \tag{4}$$

Additionally, in one or more embodiments, as shown in FIG. 7, the visual speech recognition system 106 utilizes a viseme diversity loss as part of the generator loss 712. Indeed, in some cases, the visual speech recognition system 106 utilizes the viseme diversity loss to promote viseme vocabulary diversity in the GAN. In one or more embodiments, the visual speech recognition system 106 utilizes the viseme diversity loss to expand (e.g., maximize) a distribution of a viseme vocabulary across a batch of utterances (e.g., phrases or segments of speech in digital videos). In some cases, the visual speech recognition system 106 introduces the viseme diversity loss $\mathcal{L}_{vd}$ to increase (e.g., maximize) the entropy of an averaged softmax distribution ($H_{\mathcal{G}}(\mathcal{G}$(S)) of a generator $\mathcal{G}$ (GAN) for segmented visemic speech representations S across a batch of B utterances from a digital video(s) (as shown in the following function). Thus, the viseme diversity loss function can penalize generation of visemes more heavily when those visemes reflect a narrower range of the viseme vocabulary. In other words, the viseme diversity loss can encourage utilization of a wider range of visemes from the viseme vocabulary. Indeed, in one or more embodiments, the visual speech recognition system 106 utilizes the following viseme diversity loss function (as part of the mini-max loss function (2)):

$$\mathcal{L}_{vd} = \frac{1}{|B|}\sum_{S \in B} -H_{\mathcal{G}}(\mathcal{G}(S)) \tag{5}$$

Furthermore, as mentioned above, the visual speech recognition system 106, in certain instances, modifies a mini-max loss for a GAN by utilizing the gradient penalty loss, the segment smoothness penalty loss, and the viseme diversity loss. In particular, in one or more embodiments, the visual speech recognition system 106 utilizes the functions (3)-(5) (e.g., representing the gradient penalty loss, the segment smoothness penalty loss, and the viseme diversity loss) to modify the mini-max loss function (2) using the following function:

$$\min_{G}\max_{D} \mathop{\mathbb{E}}_{\tilde{V} \sim \mathcal{V}}\left[\log \mathcal{D}(\tilde{V})\right] - \mathop{\mathbb{E}}_{S \sim \mathcal{S}}\left[\log(1 - D(\mathcal{G}(S)))\right] - \lambda\mathcal{L}_{gp} + \gamma\mathcal{L}_{sp} + \eta\mathcal{L}_{vd} \tag{6}$$

In some cases, the visual speech recognition system 106 utilizes hyperparameters λ, γ, and η to modify the gradient penalty loss $\mathcal{L}_{gp}$, the segment smoothness penalty loss $\mathcal{L}_{sp}$, and the viseme diversity loss $\mathcal{L}_{vd}$.

In some embodiments, the visual speech recognition system 106 also backpropagates a loss from the generator (and/or discriminator) to learn parameters of one or more models of the visual speech recognition system framework prior to the GAN. For example, the visual speech recognition system 106 backpropagates a loss to the clustering model to learn parameters of the clustering model (e.g., to improve a final generated viseme sequence via modifications to the clustering approach). In addition, the visual speech recognition system 106, in some implementations, also backpropagates a loss to the segmentation model (as described above) to learn parameters of the segmentation model (e.g., to improve a final generated viseme sequence via modifications to the clustering approach). Indeed, in one or more embodiments, the visual speech recognition system 106 utilizes a fully controlled neural network, an RNN, a long short-term memory (LSTM) model, and/or a transformer to learn parameters for the various steps within the framework of the visual speech recognition system.

As mentioned above, the visual speech recognition system 106 accurately recognizes visual speech from digital videos with improved flexibility and efficiency. For example, experimenters utilized a speech recognition model in accordance with one or more implementations herein to compare results with various conventional speech recognition models. Indeed, the experimenters utilized an unlabeled version of the Lip Reading Sentences 3 (LR3) dataset which contains approximately 150,000 utterances of varying lengths (e.g., about 440 hours of speech) for training (as described above) and for comparing results of a speech recognition model in accordance with one or more implementations herein and various conventional speech recognition models. In one or more embodiments, the experimenters stratified the dataset such that there is no overlap in the test set and the training set. The experiments also utilized a Lip Reading Sentences 2 (LRS2) dataset which contains approximately 150,000 transcribed utterances of varying lengths (e.g., with 224.5 hours of speech content).

In particular, the experimenters utilized various supervised conventional speech recognition models with the LRS3 and LRS2 datasets. As an example, the Experimenters utilized a Transformer with Connectionist Temporal Classification loss (TM-CTC) and a Transformer with sequence-to-sequence loss (TM-Seq2Seq) as described in Afouras, Deep Audio-Visual Speech Recognition, *IEEE Transactions on Pattern Analysis and Machine Intelligence* (2018). Moreover, the experimenters also utilized the Watch, Attend, and Spell (WAS) model (with a CNN-LSTM model with attention) as described in Chung, Lip Reading Sentences in the Wild, 2017 *IEEE Conference on Computer Vision and Pattern Recognition* (2017). Furthermore, the experiments also utilized a Spatio-Temporal Fusion based Convolutional Sequence Model (STFC) having causal convolution-RNN sequences as described in Afouras, Deep Audio-Visual Speech Recognition, *IEEE Transactions on Pattern Analysis and Machine Intelligence* (2018).

Indeed, the experimenters also utilized the visual speech recognition system in accordance with one or more implementations herein with the LRS3 and LRS2 datasets. The experimenters recorded the training set size and training time for each of the conventional supervised models and the visual speech recognition system in accordance with one or more implementations herein and the performance results on each of the LRS3 and LRS2 datasets. As shown in the following table, the experimental embodiment of the visual speech recognition system performed comparably to the supervised conventional approaches (in terms of word error rate (WER)) while using no annotated data and using only a fraction of unannotated data (with less training time).

TABLE 1

| | Results | | | Train Set | Train |
|---|---|---|---|---|---|
| Model | LRS-2 | LRS-3 | Type | Size (hrs) | Time |
| WAS | 70.4 | — | Supervised | 1637.4 | 10 d |
| TM-CTC | 72.3 | 83.1 | Supervised | 1637.4 | 19 d |
| TM-Seq2Seq | 60.5 | 70.8 | Supervised | 1637.4 | 22 d |
| STFC | 51.7 | 60.1 | Supervised | 863 | 7 d |
| Visual speech recognition system | 63.4 | 71.4 | Unsupervised | 350 | 2.5 d |

Furthermore, the experimenters also utilized the visual speech recognition system in accordance with one or more implementations with various language decoders. For example, the experimenters utilized various implementations of the visual speech recognition system with a WFST language decoder, a language model 6-gram decoder, and a language model WFST language decoder on various combinations of datasets (LRS3 and LRS2) and various input segmented visemic speech representations (e.g., mean pool PCA representations and PCA representations). For example, the following table illustrates word error rates (WER) achieved for the visual speech recognition system (in accordance with one or more implementations) as described above.

TABLE 2

| Input Embedding | Dataset | Decoder | WER |
|---|---|---|---|
| Mean Pooled PCA512 | LRS3 | WFST | 80.1 |
| PCA512 | LRS3 | WFST | 77.2 |
| Mean Pooled PCA512 | LRS3 | LM 6-gram | 74.3 |
| PCA512 | LRS3 | LM 6-gram | 71.4 |
| Mean Pooled PCA512 | LRS2 | WFST | 70.9 |
| PCA512 | LRS2 | LM WFST | 68.3 |
| Mean Pooled PCA512 | LRS2 | LM 6-gram | 65.2 |
| PCA512 | LRS2 | LM 6-gram | 63.4 |

In addition, the experimenters utilized a visual speech recognition system in accordance with one or more implementations herein (with gumbel softmax layers) to converge the model faster while keeping hyperparameters the same. Indeed, in some instances, the visual speech recognition system decreased the WER and achieved a comparable WER (to other conventional systems of approximately 74) with only 100 epochs. In addition, the Experimenters were also able to utilize the visual speech recognition system in accordance with one or more implementations herein to achieve a comparable WER with a training dataset size over 100 hours with a comparable loss to a training dataset size of 350 hours (as shown in Table 1). Indeed, the Experimental results above illustrate that the visual speech recognition system in accordance with one or more implementations herein (without labelled training data and with less training data) shows benchmark performances that are comparable to many conventional supervised models that rely on 860+ hours of labeled data.

Figure 8:
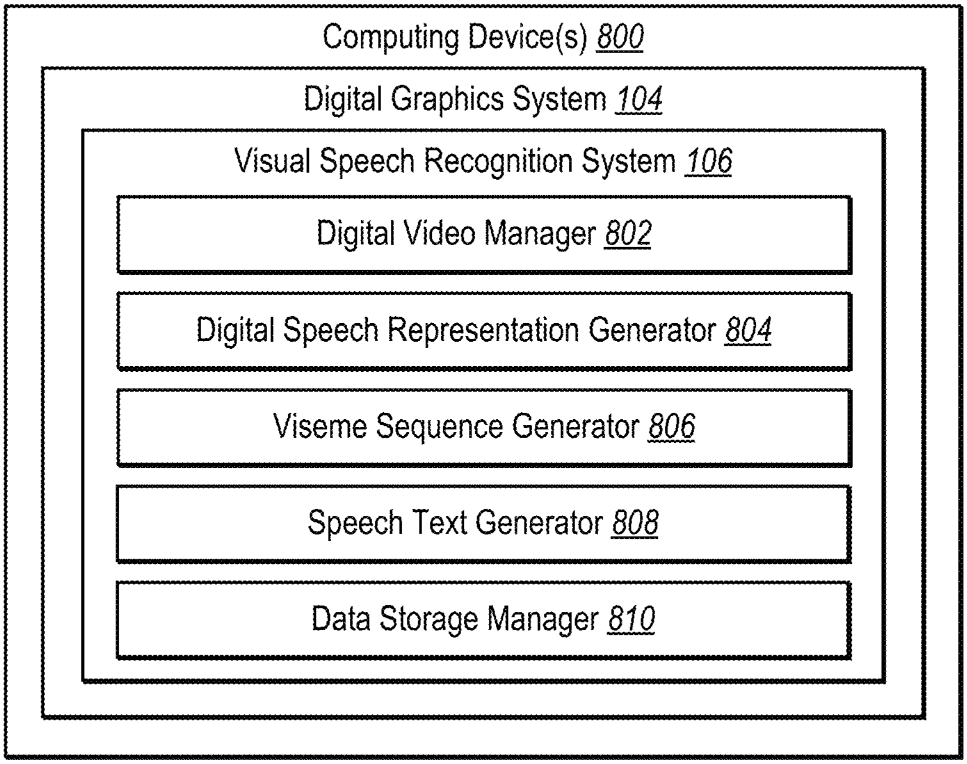
FIG. 8 illustrates a schematic diagram of a visual speech recognition system in accordance with one or more implementations.

Turning now to FIG. 8, additional detail will be provided regarding components and capabilities of one or more embodiments of the visual speech recognition system. In particular, FIG. 8 illustrates an example visual speech recognition system 106 executed by a computing device 800 (e.g., the server device(s) 102 or the client devices 110*a*-110*n*). As shown by the embodiment of FIG. 8, the computing device 800 includes or hosts the digital graphics system 104 and the visual speech recognition system 106. Furthermore, as shown in FIG. 8, the visual speech recognition system 106 includes a digital video manager 802, a visual speech representation generator 804, a viseme sequence generator 806, a speech text generator 808, and a data storage manager 810.

As just mentioned, and as illustrated in the embodiment of FIG. 8, the visual speech recognition system 106 includes the digital video manager 802. For example, the digital video manager 802 identifies, stores, and/or displays digital videos as described above (e.g., in relation to FIGS. 1 and 2). In some instances, the digital video manager 802 stores and maps generated electronic transcriptions to digital videos as described above (e.g., in relation to FIGS. 1, 2, and 5).

Furthermore, as shown in FIG. 8, the visual speech recognition system 106 includes the visual speech representation generator 804. For instance, the visual speech representation generator 804 utilizes an image encoder with frames of a digital video to generate visual speech representations for the digital video as described above (e.g., in relation to FIGS. 2 and 3). Additionally, in some cases, the visual speech representation generator 804 determines segmented visemic speech representations from clusters of visual speech representations as described above (e.g., in relation to FIGS. 2 and 3).

Moreover, as shown in FIG. 8, the visual speech recognition system 106 includes the viseme sequence generator 806. For example, the viseme sequence generator 806 utilizes a segmented visemic speech representation with a GAN to generate a viseme sequence for a digital video as described above (e.g., in relation to FIGS. 2 and 4). Furthermore, in some implementations, the viseme sequence generator 806 trains a generator and/or a discriminator to generate accurate viseme sequences as described above (e.g., in relation to FIGS. 6 and 7).

Additionally, as shown in FIG. 8, the visual speech recognition system 106 includes the speech text generator 808. For instance, the speech text generator 808 utilizes a language decoder to generate a word sequence (or electronic transcription) from the generated viseme sequences as described above (e.g., in relation to FIG. 5). Moreover, in one or more embodiments, the speech text generator 808 also utilizes the electronic transcription to generate digital audio content for a digital video as described above (e.g., in relation to FIG. 5).

As further shown in FIG. 8, the visual speech recognition system 106 includes the data storage manager 810. In some instances, the data storage manager 810 maintains data to perform one or more functions of the visual speech recognition system 106. For instance, the data storage manager 810 includes digital videos, visual speech representations, segmented visemic speech representations, viseme sequences, electronic transcriptions, and/or GAN components (e.g., neural networks, neural network parameters, training datasets).

Each of the components 802-810 of the computing device 800 (e.g., the computing device 800 implementing the visual speech recognition system 106), as shown in FIG. 8, may be in communication with one another using any suitable technology. The components 802-810 of the computing device 800 can comprise software, hardware, or both. For example, the components 802-810 can comprise one or more instructions stored on a computer-readable storage medium and executable by processor of one or more computing devices. When executed by the one or more processors, the computer-executable instructions of the visual speech recognition system 106 (e.g., via the computing device 800) can cause a client device and/or server device to perform the methods described herein. Alternatively, the components 802-810 and their corresponding elements can comprise hardware, such as a special purpose processing device to perform a certain function or group of functions. Additionally, the components 802-810 can comprise a combination of computer-executable instructions and hardware.

Furthermore, the components 802-810 of the visual speech recognition system 106 may, for example, be implemented as one or more operating systems, as one or more stand-alone applications, as one or more modules of an application, as one or more plug-ins, as one or more library functions or functions that may be called by other applications, and/or as a cloud-computing model. Thus, the components 802-810 may be implemented as a stand-alone application, such as a desktop or mobile application. Furthermore, the components 802-810 may be implemented as one or more web-based applications hosted on a remote server. The components 802-810 may also be implemented in a suite of mobile device applications or "apps." To illustrate, the components 802-810 may be implemented in an application, including but not limited to, ADOBE PHOTOSHOP, ADOBE PREMIERE, ADOBE LIGHTROOM, ADOBE ILLUSTRATOR, or ADOBE SUBSTANCE. "ADOBE," "ADOBE PHOTOSHOP," "ADOBE PREMIERE," "ADOBE LIGHTROOM," "ADOBE ILLUS- TRATOR," or "ADOBE SUBSTANCE" are either registered trademarks or trademarks of Adobe Inc. in the United States and/or other countries.

Figure 9:
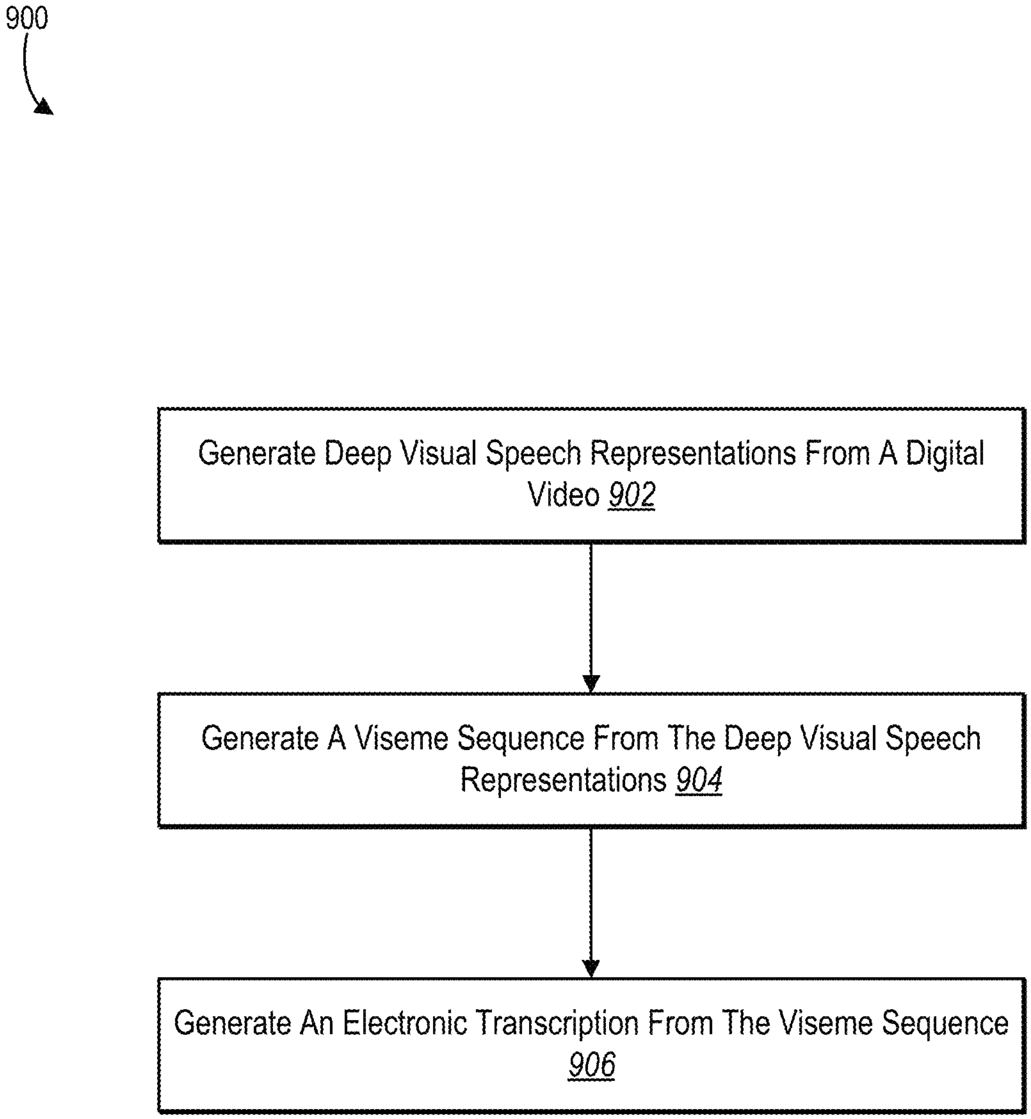
FIG. 9 illustrates a flowchart of a series of acts for recognizing visual speech from a digital video in accordance with one or more implementations.

FIGS. 1-8, the corresponding text, and the examples provide a number of different methods, systems, devices, and non-transitory computer-readable media of the visual speech recognition system 106. In addition to the foregoing, one or more embodiments can also be described in terms of flowcharts comprising acts for accomplishing a particular result, as shown in FIG. 9. The acts shown in FIG. 9 may be performed in connection with more or fewer acts. Further, the acts may be performed in differing orders. Additionally, the acts described herein may be repeated or performed in parallel with one another or parallel with different instances of the same or similar acts. A non-transitory computer-readable medium can comprise instructions that, when executed by one or more processors, cause a computing device to perform the acts of FIG. 9. In some embodiments, a system can be configured to perform the acts of FIG. 9. Alternatively, the acts of FIG. 9 can be performed as part of a computer implemented method.

As mentioned above, FIG. 9 illustrates a flowchart of a series of acts 900 for recognizing visual speech from a digital video in accordance with one or more implementations. While FIG. 9 illustrates acts according to one embodiment, alternative embodiments may omit, add to, reorder, and/or modify any of the acts shown in FIG. 9.

As shown in FIG. 9, the series of acts 900 include an act 902 of generating deep visual speech representations from a digital video. For example, the act 902 includes generating, utilizing an image encoder, a set of deep visual speech representations for a set of digital video frames of a digital video. Furthermore, in some embodiments, the act 902 includes generating a set of deep visual speech representations utilizing a transformer-based image encoder. In some cases, the act 902 includes receiving a digital video portraying a character speaking and generating, utilizing an image encoder, a set of deep visual speech representations for a set of digital video frames of the digital video.

In some instances, the act 902 includes generating, utilizing a generative adversarial neural network, a viseme sequence from a set of deep visual speech representations. For example, the act 902 includes generating deep visual speech representation clusters from a set of deep visual speech representations. Additionally, in some instances, the act 902 includes generating deep visual speech representation clusters utilizing k-means clustering on a set of deep visual speech representations.

Moreover, in one or more embodiments, the act 902 includes determining segmented visemic speech representations from deep visual speech representation clusters. Additionally, in one or more embodiments, the act 902 includes determining a segmented visemic speech representation of segmented visemic speech representations by utilizing principal component analysis representations of digital video frames from a grouping of digital video frames identified based on a deep visual speech representation cluster of the deep visual speech representation clusters.

For example, the act 902 includes determining segmented visemic speech representations by identifying a first grouping of digital video frames from a digital video based on a first deep visual speech representation cluster of deep visual speech representation clusters and generating a first segmented visemic speech representation of segmented visemic speech representations by combining visual representations of digital video frames for the first grouping of digital video frames. In addition, in some embodiments, the act 902 includes identifying a second grouping of digital video frames from a digital video based on a second deep visual speech representation cluster of deep visual speech representation clusters and generating a second segmented visemic speech representation of segmented visemic speech representations by combining additional visual representations of additional digital video frames for the second grouping of digital video frames.

Furthermore, as shown in FIG. 9, the series of acts 900 include an act 904 of generating a viseme sequence from deep speech representations. For example, the act 904 includes generating, utilizing a generative adversarial neural network, a viseme sequence from a set of deep visual speech representations. In particular, the act 904 includes generating a viseme sequence that represents speech portrayed within a digital video from segmented visemic speech representations utilizing a generative adversarial neural network. In some cases, the act 904 includes generating, utilizing a generative adversarial neural network, a viseme sequence from deep visual speech representation clusters. Furthermore, in certain embodiments, the act 904 includes generating, utilizing a generative adversarial neural network, a viseme sequence from segmented visemic speech representations determined from deep visual speech representation clusters.

In one or more embodiments, the act 904 includes learning parameters of a generative adversarial neural network utilizing a discriminator neural network. Moreover, in some implementations, the act 904 includes learning parameters of a generative adversarial neural network utilizing a discriminator neural network by generating, utilizing the discriminator neural network, an authenticity prediction from an additional viseme sequence generated by a generative adversarial neural network, determining a discriminator loss from the authenticity prediction, and learning parameters of the generative adversarial neural network utilizing the discriminator loss. In certain embodiments, the act 904 includes generating an authentic viseme sequence from a text corpus, generating, utilizing a discriminator neural network, an authenticity prediction from the authentic viseme sequence, and modifying parameters of the discriminator neural network based on the authenticity prediction. In some cases, the act 904 includes learning parameters of a generative adversarial neural network utilizing a viseme diversity loss.

Additionally, as shown in FIG. 9, the series of acts 900 include an act 906 of generating an electronic transcription from the viseme sequence. In one or more embodiments, the act 906 includes decoding, utilizing a language decoder, a viseme sequence to generate an electronic transcription that represents speech portrayed within a digital video. Furthermore, in certain instances, the act 906 includes utilizing a weighted finite-state transducer (WFST)-based language decoder to decode a viseme sequence. Moreover, in one or more embodiments, the act 906 includes generating digital audio content from an electronic transcription that represents speech portrayed within a digital video. Additionally, in one or more embodiments, the act 906 includes providing an electronic transcription of a character speaking from a digital video to a client device. In addition, in some instances, the act 906 includes generating digital audio content of a character speaking from an electronic transcription.

In addition (or in alternative) to the acts above, the visual speech recognition system 106 can also perform a step for generating an electronic transcription of a character speaking from a digital video from a set of deep visual speech representations. For example, the acts and algorithms described above in relation to FIGS. 3-5 can comprise the corresponding acts and algorithms for performing a step for generating an electronic transcription of a character speaking from a digital video from a set of deep visual speech representations.

Implementations of the present disclosure may comprise or utilize a special purpose or general-purpose computer including computer hardware, such as, for example, one or more processors and system memory, as discussed in greater detail below. Implementations within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., memory), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, implementations of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium.

Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed by a processor, cause a general-purpose computer, special purpose computer, or special purpose processing device to perform a certain function or group of functions. In some implementations, computer-executable instructions are executed by a general-purpose computer to turn the general-purpose computer into a special purpose computer implementing elements of the disclosure. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Implementations of the present disclosure can also be implemented in cloud computing environments. As used herein, the term "cloud computing" refers to a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In addition, as used herein, the term "cloud-computing environment" refers to an environment in which cloud computing is employed.

Figure 10:
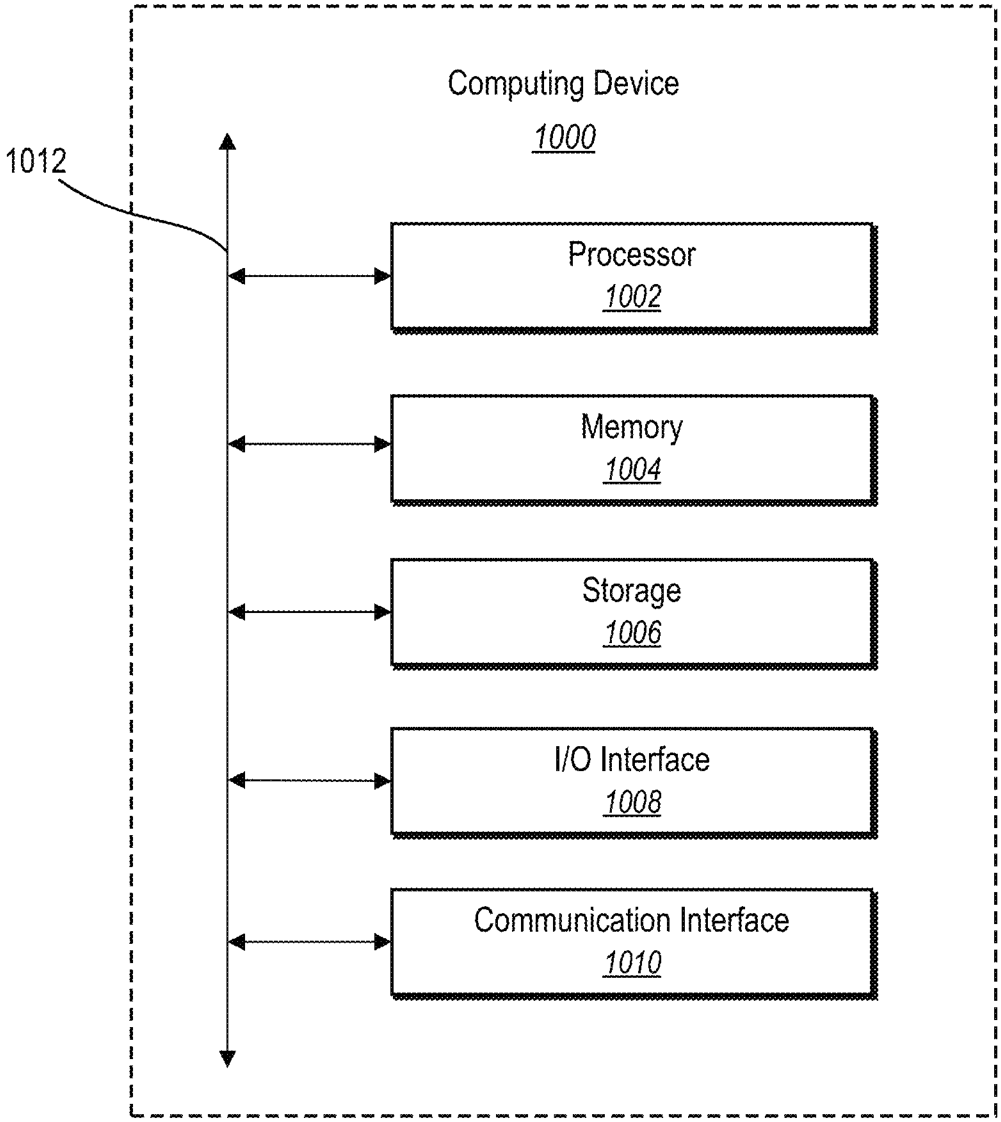
FIG. 10 illustrates a block diagram of an example computing device in accordance with one or more implementations.

FIG. 10 illustrates a block diagram of an example computing device 1000 that may be configured to perform one or more of the processes described above. One will appreciate that one or more computing devices, such as the computing device 1000 may represent the computing devices described above (e.g., computing device 800, server device(s) 102, and/or client devices 110*a*-110*n*). In one or more implementations, the computing device 1000 may be a mobile device (e.g., a mobile telephone, a smartphone, a PDA, a tablet, a laptop, a camera, a tracker, a watch, a wearable device, etc.). In some implementations, the computing device 1000 may be a non-mobile device (e.g., a desktop computer or another type of client device). Further, the computing device 1000 may be a server device that includes cloud-based processing and storage capabilities.

As shown in FIG. 10, the computing device 1000 can include one or more processor(s) 1002, memory 1004, a storage device 1006, input/output interfaces 1008 (or "I/O interfaces 1008"), and a communication interface 1010, which may be communicatively coupled by way of a communication infrastructure (e.g., bus 1012). While the computing device 1000 is shown in FIG. 10, the components illustrated in FIG. 10 are not intended to be limiting. Additional or alternative components may be used in other implementations. Furthermore, in certain implementations, the computing device 1000 includes fewer components than those shown in FIG. 10. Components of the computing device 1000 shown in FIG. 10 will now be described in additional detail.

In particular implementations, the processor(s) 1002 includes hardware for executing instructions, such as those making up a computer program. As an example, and not by way of limitation, to execute instructions, the processor(s) 1002 may retrieve (or fetch) the instructions from an internal register, an internal cache, memory 1004, or a storage device 1006 and decode and execute them.

The computing device 1000 includes memory 1004, which is coupled to the processor(s) 1002. The memory 1004 may be used for storing data, metadata, and programs for execution by the processor(s). The memory 1004 may include one or more of volatile and non-volatile memories, such as Random-Access Memory ("RAM"), Read-Only Memory ("ROM"), a solid-state disk ("SSD"), Flash, Phase Change Memory ("PCM"), or other types of data storage. The memory 1004 may be internal or distributed memory.

The computing device 1000 includes a storage device 1006 includes storage for storing data or instructions. As an example, and not by way of limitation, the storage device 1006 can include a non-transitory storage medium described above. The storage device 1006 may include a hard disk drive ("HDD"), flash memory, a Universal Serial Bus ("USB") drive or a combination these or other storage devices.

As shown, the computing device 1000 includes one or more I/O interfaces 1008, which are provided to allow a user to provide input to (such as user strokes), receive output from, and otherwise transfer data to and from the computing device 1000. These I/O interfaces 1008 may include a mouse, keypad or a keyboard, a touch screen, camera, optical scanner, network interface, modem, other known I/O devices or a combination of such I/O interfaces 1008. The touch screen may be activated with a stylus or a finger.

The I/O interfaces 1008 may include one or more devices for presenting output to a user, including, but not limited to, a graphics engine, a display (e.g., a display screen), one or more output drivers (e.g., display drivers), one or more audio speakers, and one or more audio drivers. In certain implementations, I/O interfaces 1008 are configured to provide graphical data to a display for presentation to a user. The graphical data may be representative of one or more graphical user interfaces and/or any other graphical content as may serve a particular implementation.

The computing device 1000 can further include a communication interface 1010. The communication interface 1010 can include hardware, software, or both. The communication interface 1010 provides one or more interfaces for communication (such as, for example, packet-based communication) between the computing device and one or more other computing devices or one or more networks. As an example, and not by way of limitation, communication interface 1010 may include a network interface controller ("NIC") or network adapter for communicating with an Ethernet or other wire-based network or a wireless NIC ("WNIC") or wireless adapter for communicating with a wireless network, such as a WI-FI. The computing device 1000 can further include a bus 1012. The bus 1012 can include hardware, software, or both that connects components of computing device 1000 to each other.

In the foregoing specification, the invention has been described with reference to specific example implementations thereof. Various implementations and aspects of the invention(s) are described with reference to details discussed herein, and the accompanying drawings illustrate the various implementations. The description above and drawings are illustrative of the invention and are not to be construed as limiting the invention. Numerous specific details are described to provide a thorough understanding of various implementations of the present invention.

The present invention may be embodied in other specific forms without departing from its spirit or essential characteristics. The described implementations are to be considered in all respects only as illustrative and not restrictive. For example, the methods described herein may be performed with less or more steps/acts or the steps/acts may be performed in differing orders. Additionally, the steps/acts described herein may be repeated or performed in parallel to one another or in parallel to different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A non-transitory computer-readable medium storing instructions that, when executed by at least one processor, cause a computing device to:

train a generative adversarial neural network to generate viseme sequences utilizing visual training data by:

generating, utilizing parameters of the generative adversarial neural network, viseme sequence predictions from the visual training data;

generating, utilizing a viseme sequence discriminator neural network, authenticity predictions from the viseme sequence predictions;

generating a segment smoothness loss, wherein the segment smoothness loss penalizes sequential changes of structural mouth movements indicated by visemic speech representations of the visual training data; and generating modified parameters of the generative adversarial neural network based on the authenticity predictions and the segment smoothness loss;

generate, utilizing a transformer-based image encoder, a set of deep visual speech representations for a set of digital video frames of a digital video by generating a deep visual visemic speech representation that represents viseme features visually portrayed in a digital video frame from the set of digital video frames, wherein a viseme feature from the viseme features corresponds to a visual viseme relating to multiple audible phonemes;

generate, utilizing the modified parameters of the generative adversarial neural network, a viseme sequence from the set of deep visual speech representations; and decode, utilizing a language decoder, the viseme sequence to generate an electronic transcription that represents speech portrayed within the digital video.

2. The non-transitory computer-readable medium of claim 1, further comprising instructions that, when executed by the at least one processor, cause the computing device to generate the set of deep visual speech representations by utilizing the transformer-based image encoder to embed pixel values from the set of digital video frames into a feature space.

3. The non-transitory computer-readable medium of claim 1, further comprising instructions that, when executed by the at least one processor, cause the computing device to:

generate deep visual speech representation clusters from the set of deep visual speech representations; and generate, utilizing the generative adversarial neural network, the viseme sequence from the deep visual speech representation clusters.

4. The non-transitory computer-readable medium of claim 3, further comprising instructions that, when executed by the at least one processor, cause the computing device to generate, utilizing the generative adversarial neural network, the viseme sequence from segmented visemic speech representations determined from the deep visual speech representation clusters.

5. The non-transitory computer-readable medium of claim 1, further comprising instructions that, when executed by the at least one processor, cause the computing device to:

identify one or more training digital videos depicting visual speech through structural mouth movements; and generating, utilizing the transformer-based image encoder, the visemic speech representations of the visual training data from the one or more training digital videos.

6. The non-transitory computer-readable medium of claim 1, further comprising instructions that, when executed by the at least one processor, cause the computing device to learn parameters of the generative adversarial neural network utilizing the viseme sequence discriminator neural network by:

generating, utilizing the viseme sequence discriminator neural network, an authenticity prediction from an additional viseme sequence generated by the generative adversarial neural network;

determining a discriminator loss from the authenticity prediction and a viseme training data set generated for viseme sequences; and modifying parameters of the generative adversarial neural network utilizing the discriminator loss.

7. The non-transitory computer-readable medium of claim 6, further comprising instructions that, when executed by the at least one processor, cause the computing device to:

generate the viseme training data set by generating a viseme sequence corpus from a text corpus by converting phonemes from the text corpus into viseme sequences; and determine the discriminator loss from the authenticity prediction based on comparing the additional viseme sequence generated by the generative adversarial neural network to one or more training viseme sequences from the viseme sequence corpus.

8. The non-transitory computer-readable medium of claim 1, further comprising instructions that, when executed by the at least one processor, cause the computing device to train the generative adversarial neural network by:

generating a viseme diversity loss and a gradient penalty loss based on a norm penalty of gradient of the viseme sequence discriminator neural network; and generating the modified parameters of the generative adversarial neural network based on the viseme diversity loss and the gradient penalty loss.

9. The non-transitory computer-readable medium of claim 8, further comprising instructions that, when executed by the at least one processor, cause the computing device to:

determine the gradient penalty loss to train the generative adversarial neural network on a random number of viseme samples through a norm penalty of gradient of the viseme sequence discriminator neural network; or determine the viseme diversity loss based on a distribution of a viseme vocabulary across a batch of speech utterances.

10. A system comprising:

one or more memory devices comprising a digital video, a transformer-based image encoder, and a generative adversarial neural network; and one or more processors configured to cause the system to:

generate, utilizing the transformer-based image encoder, a set of deep visual speech representations for a set of digital video frames of the digital video by generating a deep visual visemic speech representation that represents viseme features visually portrayed in a digital video frame from the set of digital video frames, wherein a viseme feature from the viseme features corresponds to a visual viseme relating to multiple audible phonemes;

generate deep visual speech representation clusters from the set of deep visual speech representations;

determine segmented visemic speech representations from the deep visual speech representation clusters; and generate a viseme sequence that represents speech portrayed within the digital video from the segmented visemic speech representations by utilizing the generative adversarial neural network trained utilizing a viseme sequence discriminator neural network that generates authenticity predictions from visual training data comprising the visual viseme relating to the multiple audible phonemes.

11. The system of claim 10, wherein the one or more processors are further configured to cause the system to generate the deep visual speech representation clusters utilizing k-means clustering on the set of deep visual speech representations.

12. The system of claim 10, wherein the one or more processors are further configured to cause the system to determine the segmented visemic speech representations by identifying a first grouping of digital video frames from the digital video based on a first deep visual speech representation cluster of the deep visual speech representation clusters.

13. The system of claim 12, wherein the one or more processors are further configured to cause the system to generate a first segmented visemic speech representation of the segmented visemic speech representations by combining visual representations of digital video frames for the first grouping of digital video frames.

14. The system of claim 13, wherein the one or more processors are further configured to cause the system to determine the segmented visemic speech representations by:

identifying a second grouping of digital video frames from the digital video based on a second deep visual speech representation cluster of the deep visual speech representation clusters; and generating a second segmented visemic speech representation of the segmented visemic speech representations by combining additional visual representations of additional digital video frames for the second grouping of digital video frames.

15. The system of claim 10, wherein the one or more processors are further configured to train the generative adversarial neural network to generate viseme sequences utilizing visual training data by:

generating, utilizing parameters of the generative adversarial neural network, viseme sequence predictions from the visual training data;

generating, utilizing a viseme sequence discriminator neural network, authenticity predictions from the viseme sequence predictions;

generating a segment smoothness loss, wherein the segment smoothness loss penalizes sequential changes of structural mouth movements indicated by visemic speech representations of the visual training data; and generating modified parameters of the generative adversarial neural network based on the authenticity predictions and the segment smoothness loss.

16. The system of claim 10, wherein the one or more processors are further configured to modify parameters of the generative adversarial neural network utilizing:

a gradient penalty loss to train the generative adversarial neural network on a random number of viseme samples through a norm penalty of gradient of the viseme sequence discriminator neural network;

a segment smoothness penalty that reduces noisy training data corresponding to sudden changes of visual mouth movements in between training visemic speech representations; and a viseme diversity loss based on a distribution of a viseme vocabulary across a batch of speech utterances.

17. The system of claim 10, wherein the one or more processors are further configured to train the viseme sequence discriminator neural network by:

generating an authentic viseme sequence from a text corpus;

generating, utilizing the viseme sequence discriminator neural network, an authenticity prediction from the authentic viseme sequence; and modifying parameters of the viseme sequence discriminator neural network based on the authenticity prediction.

18. A computer-implemented method comprising:

generating, utilizing a transformer-based image encoder, a set of deep visual speech representations for a set of digital video frames of a digital video by generating a deep visual visemic speech representation that represents viseme features visually portrayed in a digital video frame from the set of digital video frames, wherein a viseme feature from the viseme features corresponds to a visual viseme relating to multiple audible phonemes;

generating a viseme sequence from the set of deep visual speech representations utilizing a generative adversarial neural network, wherein the generative adversarial neural network is trained utilizing visual training data, a viseme sequence discriminator network, and a segment smoothness loss, wherein the segment smoothness loss penalizes sequential changes of structural mouth movements within visual training data; and decoding, utilizing a language decoder, the viseme sequence to generate an electronic transcription that represents speech portrayed within the digital video.

19. The computer-implemented method of claim 18, further comprising generating the electronic transcription from the viseme sequence without utilizing digital audio of the digital video.

20. The computer-implemented method of claim 18, further comprising generating digital audio content of a character speaking from the electronic transcription.

* * * * *